(12) United States Patent
O'Brien et al.

(10) Patent No.: US 10,746,901 B2
(45) Date of Patent: Aug. 18, 2020

(54) SYSTEMS AND METHODS FOR PREDICTING ARRIVAL OF WIND EVENT AT AEROMECHANICAL APPARATUS

(71) Applicant: OPHIR CORPORATION, Littleton, CO (US)

(72) Inventors: Martin O'Brien, Conifer, CO (US); Loren M. Caldwell, Fort Collins, CO (US); Phillip E. Acott, Fort Collins, CO (US); Lisa G. Spaeth, Littleton, CO (US)

(73) Assignee: Ophir Corporation, Littleton, CO (US)

( * ) Notice: Subject to any disclaimer, the term of this patent is extended or adjusted under 35 U.S.C. 154(b) by 950 days.

(21) Appl. No.: 14/715,869

(22) Filed: May 19, 2015

(65) Prior Publication Data
US 2015/0247953 A1 Sep. 3, 2015

Related U.S. Application Data

(63) Continuation-in-part of application No. 13/348,307, filed on Jan. 11, 2012, now abandoned.
(Continued)

(51) Int. Cl.
*G01W 1/10* (2006.01)
*G01S 17/95* (2006.01)
(Continued)

(52) U.S. Cl.
CPC .............. *G01W 1/10* (2013.01); *F03D 7/042* (2013.01); *F03D 17/00* (2016.05); *G01P 5/001* (2013.01);
(Continued)

(58) Field of Classification Search
None
See application file for complete search history.

(56) References Cited

U.S. PATENT DOCUMENTS 4,995,720 A 2/1991 Amzajerdian
5,982,046 A 11/1999 Minh
(Continued)

FOREIGN PATENT DOCUMENTS

CN 103472502 12/2013
CN 104200067 12/2014
(Continued)

OTHER PUBLICATIONS

K. Saranyasoontorn & L. Manuel, "On the use of proper orthogonal decomposition to describe inflow turbulence and wind turbine loads", ICOSSAR 2005, © 2005 Millpress, Rotterdam, ISBN 90 5966 040 4, pp. 1309-1316, http://www.ce.utexas.edu/prof/Manuel/Papers/SaranyasoontornManuel_ICOSSAR2005.PDF.*
(Continued)

*Primary Examiner* — Alexander Satanovsky
(74) *Attorney, Agent, or Firm* — Lathrop GPM LLP

(57) ABSTRACT

A method for predicting arrival of a wind event at an aeromechanical structure includes sensing wind velocity in an atmospheric volume moving towards the aeromechanical structure to obtain a time series of spatially distributed wind velocity measurements, determining presence of the wind event from at least one of the distributed wind velocity measurements, and tracking the wind event based upon the time series of spatially distributed wind velocity measurements to estimate arrival time of the wind event at the aeromechanical structure. A wind-predicting system uses a lidar and a wind-predicting unit to implement this method. An aeromechanical apparatus integrates this wind-predicting system to predict wind events at the aeromechanical apparatus.

28 Claims, 20 Drawing Sheets

Related U.S. Application Data

(60) Provisional application No. 61/431,696, filed on Jan. 11, 2011.

(51) Int. Cl.

| | | |
|---|---|---|
| *G01P 5/00* | (2006.01) | |
| *F03D 7/04* | (2006.01) | |
| *G01P 5/26* | (2006.01) | |
| *G01S 17/58* | (2006.01) | |
| *G01W 1/00* | (2006.01) | |
| *G01S 7/481* | (2006.01) | |
| *F03D 17/00* | (2016.01) | |

(52) U.S. Cl.
CPC ............. *G01P 5/26* (2013.01); *G01S 7/4817* (2013.01); *G01S 17/58* (2013.01); *G01S 17/95* (2013.01); *G01W 1/00* (2013.01); *F05B 2260/821* (2013.01); *F05B 2270/32* (2013.01); *F05B 2270/321* (2013.01); *F05B 2270/322* (2013.01); *F05B 2270/8042* (2013.01); *Y02A 90/19* (2018.01); *Y02E 10/723* (2013.01)

(56) References Cited

U.S. PATENT DOCUMENTS

| | | | |
|---|---|---|---|
| 6,198,564 B1* | 3/2001 | Knight | F41G 7/2213 244/3.16 |
| 6,456,226 B1 | 9/2002 | Zheng et al. | |
| 6,502,459 B1 | 1/2003 | Bonne et al. | |
| 7,281,891 B2 | 10/2007 | Smith et al. | |
| 9,429,400 B1* | 8/2016 | Sowle | F42B 10/02 |
| 2003/0009268 A1* | 1/2003 | Inokuchi | G01S 17/95 701/14 |
| 2003/0160457 A1* | 8/2003 | Ragwitz | F03D 7/043 290/44 |
| 2004/0183307 A1 | 9/2004 | Yoshida et al. | |
| 2005/0267629 A1 | 12/2005 | Petersson et al. | |
| 2006/0145483 A1 | 7/2006 | Larsen et al. | |
| 2008/0043234 A1 | 2/2008 | Mirand et al. | |
| 2009/0060740 A1 | 3/2009 | Stiesdal et al. | |
| 2009/0140522 A1 | 5/2009 | Chapple et al. | |
| 2010/0148507 A1 | 6/2010 | Lim et al. | |
| 2010/0180694 A1* | 7/2010 | Ely, III | G01W 1/10 73/861.42 |
| 2010/0195100 A9 | 8/2010 | Caldwell et al. | |
| 2010/0241280 A1* | 9/2010 | Garcia Barace | F03D 7/0224 700/287 |
| 2011/0149268 A1* | 6/2011 | Marchant | G01P 5/001 356/27 |
| 2011/0216307 A1* | 9/2011 | Belen, Jr. | G01P 5/26 356/28.5 |
| 2012/0051907 A1* | 3/2012 | Rogers | F03D 7/0224 416/1 |
| 2012/0065788 A1* | 3/2012 | Harper, III | G06F 1/3206 700/291 |
| 2012/0101747 A1* | 4/2012 | Kielkopf | G01M 3/002 702/51 |
| 2012/0169053 A1* | 7/2012 | Tchoryk, Jr. | G01P 5/26 290/44 |
| 2012/0179376 A1 | 7/2012 | O'Brien et al. | |
| 2013/0033040 A1* | 2/2013 | Bowyer | F03D 7/028 290/44 |
| 2013/0106107 A1* | 5/2013 | Spruce | F03D 7/0224 290/44 |
| 2014/0070538 A1 | 3/2014 | Bowyer et al. | |
| 2014/0125058 A1 | 5/2014 | Olesen | |
| 2014/0339828 A1 | 11/2014 | Peiffer et al. | |
| 2014/0367967 A1 | 12/2014 | Ossyra | |

FOREIGN PATENT DOCUMENTS

| | | |
|---|---|---|
| DE | 102009030886 A | 12/2010 |
| EP | 1460266 A2 | 9/2004 |
| EP | 2025929 A2 | 2/2009 |
| JP | 2004/333081 | 11/2004 |
| JP | 200612565 A | 5/2006 |
| JP | 2008-500525 A | 1/2008 |
| JP | 2014/066548 | 4/2014 |
| JP | 2014-066548 A | 4/2014 |
| KR | 101076222 | 10/2011 |
| WO | 2012097076 | 7/2012 |
| WO | WO 2015/065873 | 5/2015 |

OTHER PUBLICATIONS

International Search Report and Written Opinion of PCT/US2016/33233 dated Aug. 31, 2016.
PCT Patent Application PCT/US2012/020957 International Search Report and Written Opinion dated Aug. 21, 2012, 91 pages.
Dakin, E, et al. "Catching the Wind," Catch the Wind, Inc., pp. 1-9, Mar. 3, 2011.
Dunne, F., et al. "Combining Standard Feedback Controllers with Feedforward Blade Pitch Control for Loan Mitigation in Wind Turbines," AIAA, pp. 1-18, Jan. 2010.
Laks, J., et al., Blade Pitch Control with Preview Wind Measurements, AIAA, pp. 1-24, 2010.
Mikkelsen, T., et al., "Lidar Wind Speed Measurements from a Rotating Spinner," European Wind Energy Conference, Warsaw Apr. 20-23, 2010.
U.S. Appl. No. 13/348,307 select file history dated Jun. 26, 2014 through Nov. 19, 2014, 50 pages.
European Patent Application No. 16797288.4, Extended Search and Opinion dated Jan. 24, 2019, 9 pages.
Schlipf et al. (2012) "Comparison of feedforward and model predictive control of wind turbines using LIDAR", Decision and Control (CDC), 2012 IEEE 51$^{st}$ Annual Conference on, IEEE, pp. 3050-3055.
Japanese Patent Application No. 2017-560319, English Translation of Office Action dated May 22, 2020, 6 pages.

* cited by examiner

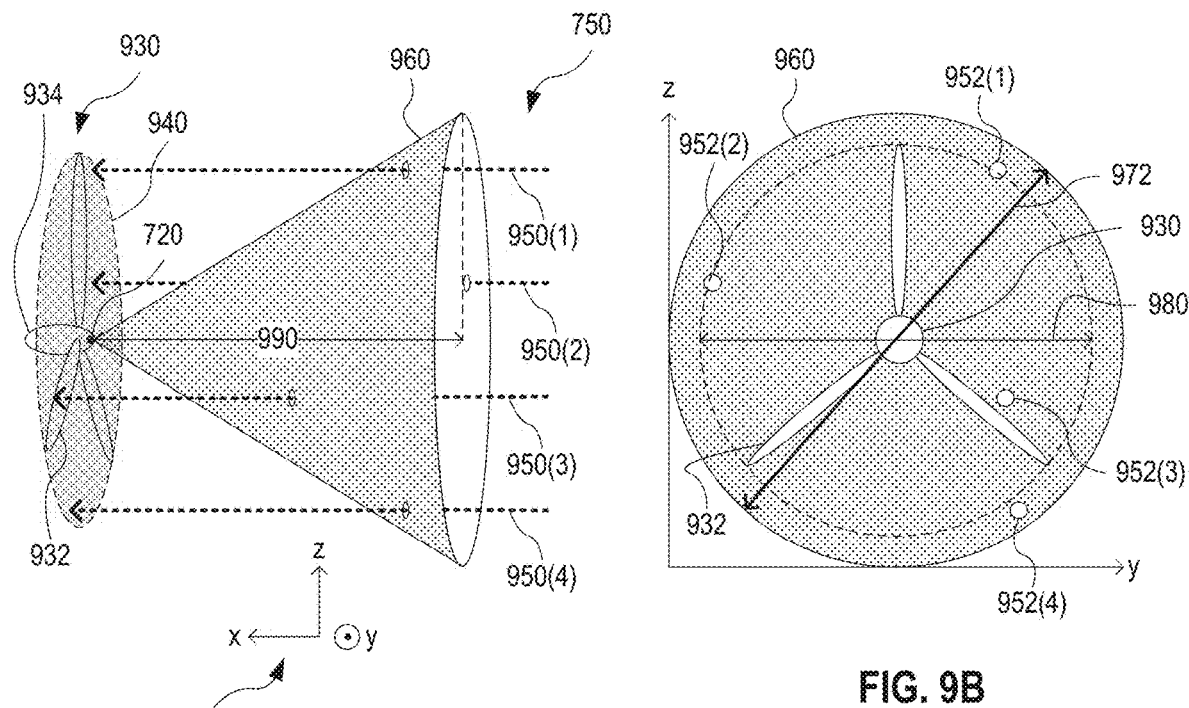
FIG. 9A
FIG. 9B
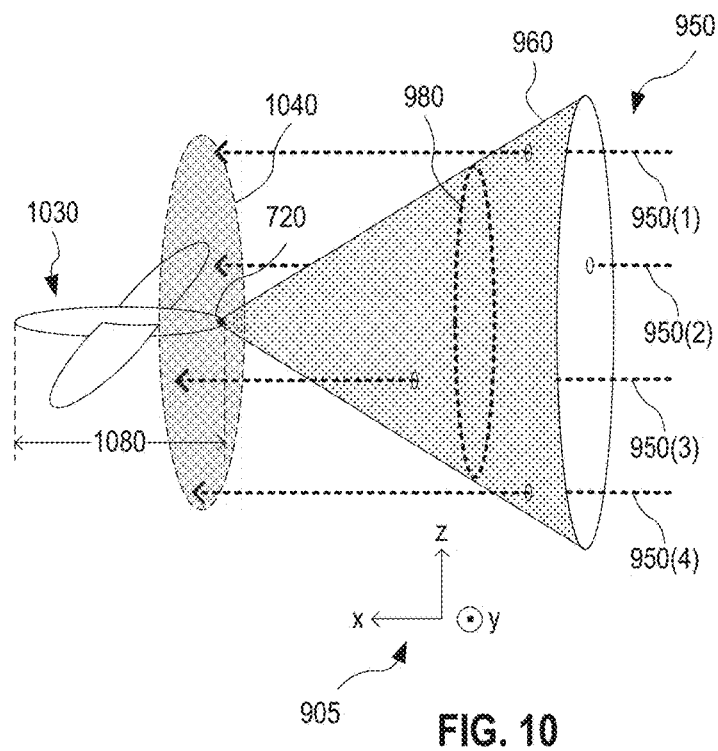
FIG. 10

SYSTEMS AND METHODS FOR PREDICTING ARRIVAL OF WIND EVENT AT AEROMECHANICAL APPARATUS

CROSS-REFERENCE TO RELATED APPLICATIONS

This application is a continuation-in-part of U.S. patent application Ser. No. 13/348,307, filed Jan. 11, 2012, entitled "Methods and Apparatus For Monitoring Complex Flow Fields For Wind Turbine Applications", which claims the benefit of the filing date of U.S. Provisional Patent Application No. 61/431,696, filed Jan. 11, 2011, entitled "Methods and Apparatus For Monitoring Complex Flow Fields For Wind Turbine Applications". The above identified applications are incorporated herein by reference in their entireties. U.S. patent application Ser. No. 12/138,163, filed Jun. 12, 2008, and entitled "Optical Air and Data Systems and Methods," is incorporated herein by reference.

BACKGROUND

Laser radar (lidar) has been used on military and commercial aircraft for the purpose of measuring wind hazards and providing optical air data. Lidar is an optical remote sensing technology that measures properties of scattered light to find range and/or other information of a distant target. The range to an object is determined by measuring the time delay between transmission of a laser pulse and detection of the reflected signal.

Aircraft and wind turbines (or wind turbine generators) operate within complex, on-coming, flow fields and have a distinct need for advanced detection, classification, measurement, warning and/or mitigation of wind hazards. The flow fields may vary from highly laminar through highly turbulent, depending on the local weather, time of day, humidity, temperature, lapse rate, turbine location, local terrain, etc. Wind hazards applicable to wind turbines include gusts, high wind speed, vertical and horizontal wind shear, nocturnal low level jets, convective activity, microbursts, complex terrain-induced flows, Kelvin Helmholtz instabilities, turbulence, and other similar events.

Wind turbines may rotate about either a horizontal or a vertical axis, with horizontal-axis turbines far more common. Horizontal-axis wind turbines (HAWT) have a rotor shaft and an electrical generator typically located at the top of a tower, and the rotor shaft is typically parallel with the wind during usage. HAWTs achieve high efficiency since their blades move substantially perpendicular to the wind. Since the tower that supports the turbine produces turbulence behind it, the turbine blades are usually positioned upwind of the tower.

FIG. 1 is a simplified diagram of a horizontal-axis wind turbine 100. The HAWTs may include one, two, three, or more rotating symmetrical blades 102, each having a blade axis approximately perpendicular to the horizontal axis of rotation 104. Turbine blades are generally stiff to prevent the blades from being pushed into the tower by high winds. The blades may be caused to bend by the high winds. High wind speed, gusts and turbulence may lead to fatigue failures of the wind turbines. Blade pitch control is a feature of nearly all large modern horizontal-axis wind turbines to permit adjustment of wind-turbine blade loading, generator shaft rotation speed and the generated power as well as protection from damage during high-wind conditions. While operating, a control system for a wind turbine adjusts the blade pitch by rotating each blade about the blade's axis. Furthermore, wind turbines typically require a yaw control mechanism to turn the axis of wind-turbine rotation, blades and nacelle toward the wind. By minimizing a yaw angle that is the misalignment between wind and turbine pointing direction, the power output is maximized and non-symmetrical loads minimized.

SUMMARY

This disclosure advances the art by providing a cost effective method for, in certain embodiments, measuring long range wind flow data using a single lidar mounted on a wind turbine generator and calculating wind flow fields near a rotor plane of a wind turbine generator using a computer system with a processor. In an embodiment, the method generates range-resolved wind data in real time for each blade of the wind turbine generator, and also provides classification data and codes to a control system coupled to the wind turbine generator. In one implementation, the methods and system enable the wind turbine generator to provide for blade pitch control and effective gust alleviation, to reduce structural fatigue and damage, and improve reliability of the wind turbine generator, and to enhance energy capture efficiency for the wind turbine generator. In another implementation, the methods and systems enable an aircraft to correct for an approaching wind event to reduce the effect of the wind event on the aircraft. Such corrections may include gust alleviation, dynamic turbulence mitigation, horizontal and vertical shear mitigation, and enhanced ride comfort.

In an embodiment, a method for predicting arrival of a wind event at an aeromechanical structure includes sensing wind velocity in an atmospheric volume moving towards the aeromechanical structure to obtain a time series of spatially distributed wind velocity measurements. The method determines presence of the wind event from at least one of the distributed wind velocity measurements. When the wind event is present, the method tracks the wind event based upon the time series of spatially distributed wind velocity measurements to estimate arrival time of the wind event at the aeromechanical structure.

In an embodiment, a system for predicting arrival of a wind event at an aeromechanical structure includes a lidar for sensing wind velocity in an atmospheric volume moving towards the aeromechanical structure to obtain a time series of spatially distributed wind velocity measurements. The system further includes (a) a wind event identification module for determining presence of the wind event from at least one of the spatially distributed wind velocity measurements, and (b) a tracking module for tracking the wind event based upon the time series of spatially distributed wind velocity measurements to estimate arrival time of the wind event at the aeromechanical structure.

In an embodiment, an aeromechanical apparatus with prediction-based control of response to a wind event includes a lidar for sensing wind velocity in an atmospheric volume moving towards the aeromechanical apparatus to obtain a time series of spatially distributed wind velocity measurements, and a wind-predicting unit for predicting arrival of the wind event at the aeromechanical apparatus based upon the time series of spatially distributed wind velocity measurements. The aeromechanical apparatus further includes at least one actuator for moving at least part of the aeromechanical apparatus relative to the atmospheric volume, and a control module for controlling the actuator based upon said predicting arrival of the wind event.

Additional embodiments and features are set forth in the description that follows, and still other embodiments will become apparent to those skilled in the art upon examination of the specification or may be learned by the practice of the invention.

BRIEF DESCRIPTION OF THE DRAWINGS

Illustrative embodiments of the present invention are described in detail below with reference to the attached drawings.

FIGS. 9A and 9B illustrate a scenario, wherein a lidar measures wind velocities for an atmospheric volume generally moving towards a wind turbine, according to an embodiment.

FIG. 10 illustrates a scenario, wherein a lidar measures wind velocities for an atmospheric volume generally moving towards an aircraft, according to an embodiment.

DETAILED DESCRIPTION

Figure 1:
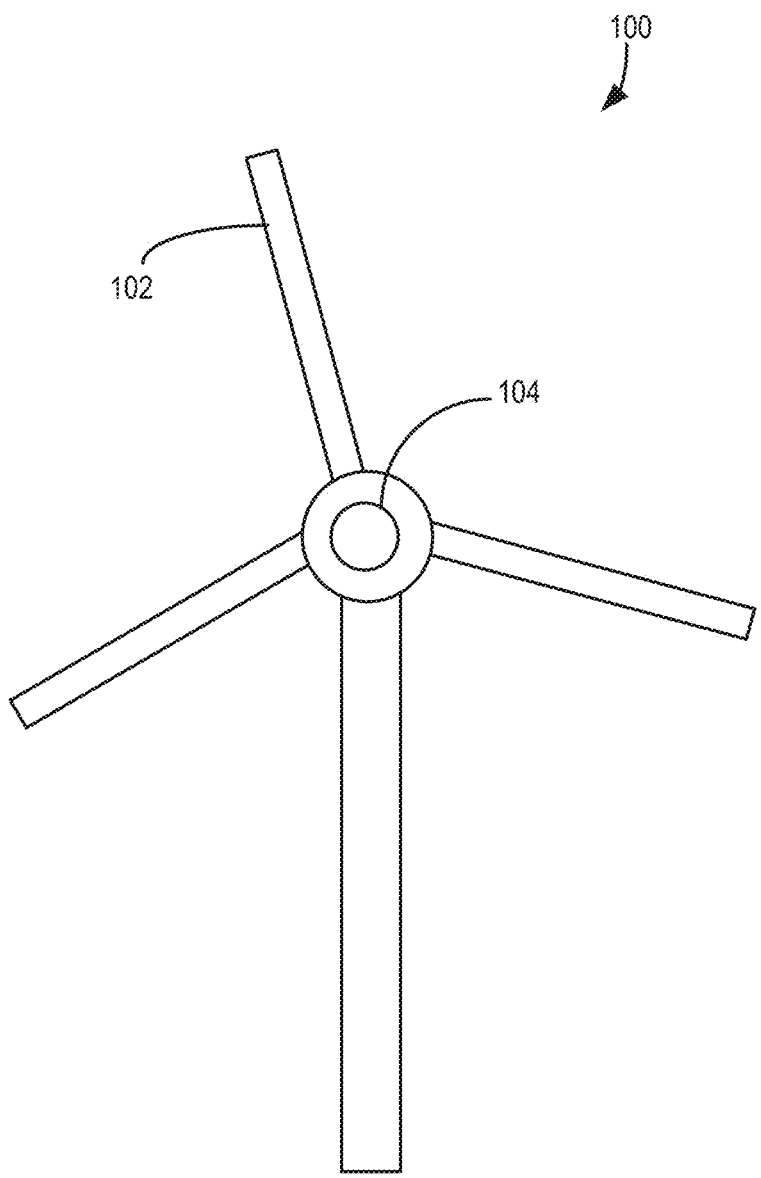
FIG. 1 is a simplified diagram of a horizontal axis wind turbine generator.

The present disclosure may be understood by reference to the following detailed description, taken in conjunction with the drawings as described below. It is noted that, for purposes of illustrative clarity, certain elements in the drawings may not be drawn to scale. Reference numbers for items that appear multiple times may be omitted for clarity. Where possible, the same reference numbers are used throughout the drawings and the following description to refer to the same or similar parts.

Effective wind hazard monitoring apparatus needs to provide accurate wind data at sufficiently fine spatial scales and sufficiently fast temporal scales to determine the type and severity of wind hazard. A blade-pitch control algorithm needs short range wind data that are at most a few seconds away from the wind turbine generator. In addition, for optimal control the wind turbine generator needs wind information over the entire swept area of the rotor or blade of the wind turbine generator. These regions cannot be monitored with a single fixed-orientation laser radar. Measurements with multiple lidars would be very expensive.

Methods are disclosed for measuring winds further away from the wind turbine generator and estimating the oncoming winds at a rotor plane where one, two, three or more rotating blades are located, with a preview time. This estimation is based on wind measurements at longer ranges, including, for example, the horizontal and vertical shear, the spatial structure of the wind field and its temporal characteristics. More specifically, in certain embodiments, the methods and systems herein disclosed include (1) monitoring oncoming wind conditions and hazards with sufficient speed and spatial resolution; (2) achieving a cost-effective and robust laser radar system design; (3) providing data analysis and data products to be used by wind turbine control systems that may include both hardware components and software for gust alleviation and blade pitch control and yaw control, (4) determining severity of wind events, including horizontal shear, vertical shear, gusts, turbulent flow, low level jets and Kelvin Helmholtz instabilities; (5) classifying the on-coming flow field to enable the wind turbine generator control systems to properly react, in a timely fashion, to the on-coming flow field; (6) calculating data products from the Lidar-measured flow-field; and (7) providing such data analyses and products at sufficient speeds, and at appropriate spatial locations, for effective gust alleviation and blade pitch control and yaw control to reduce structural fatigue and damage, to improve reliability, and to enhance energy capture efficiency for modern wind turbine generators.

Figure 2:
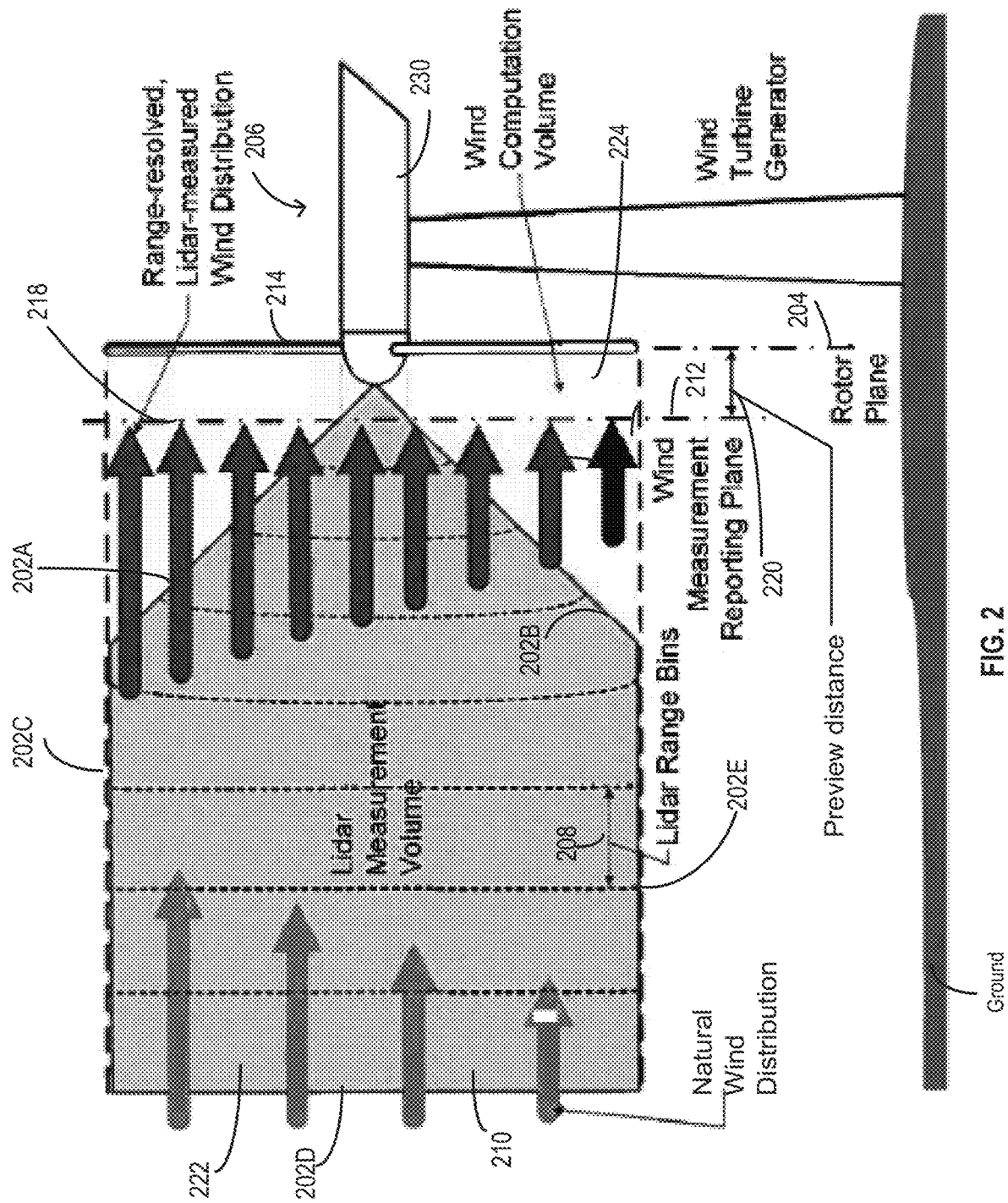
FIG. 2 is a diagram illustrating range-resolved lidar-measured wind distribution near a wind turbine generator in one embodiment where the lidar is mounted in the turbine hub, at rotor height.

FIG. 2 is a diagram illustrating range-resolved lidar-measured wind distribution near a wind turbine generator 206 in an embodiment. The wind turbine generator 206 has one, two, three or more rotating blades 214 in a rotor plane 204. Natural wind distribution as pointed by arrows 210 is detected as a function of position, or range from the turbine. Lidar range bin length 208 provides the spatial resolution of a laser radar for wind flow measurements. The natural wind typically has a velocity gradient or a vertical shear above ground. The vertical speed variation may be provided for altitude adjustment for each blade as it rotates from low to high altitude and back to low altitude. Wind measurement reporting plane 212 is defined by a preview distance 220 from the rotor plane 204.

Figure 3:
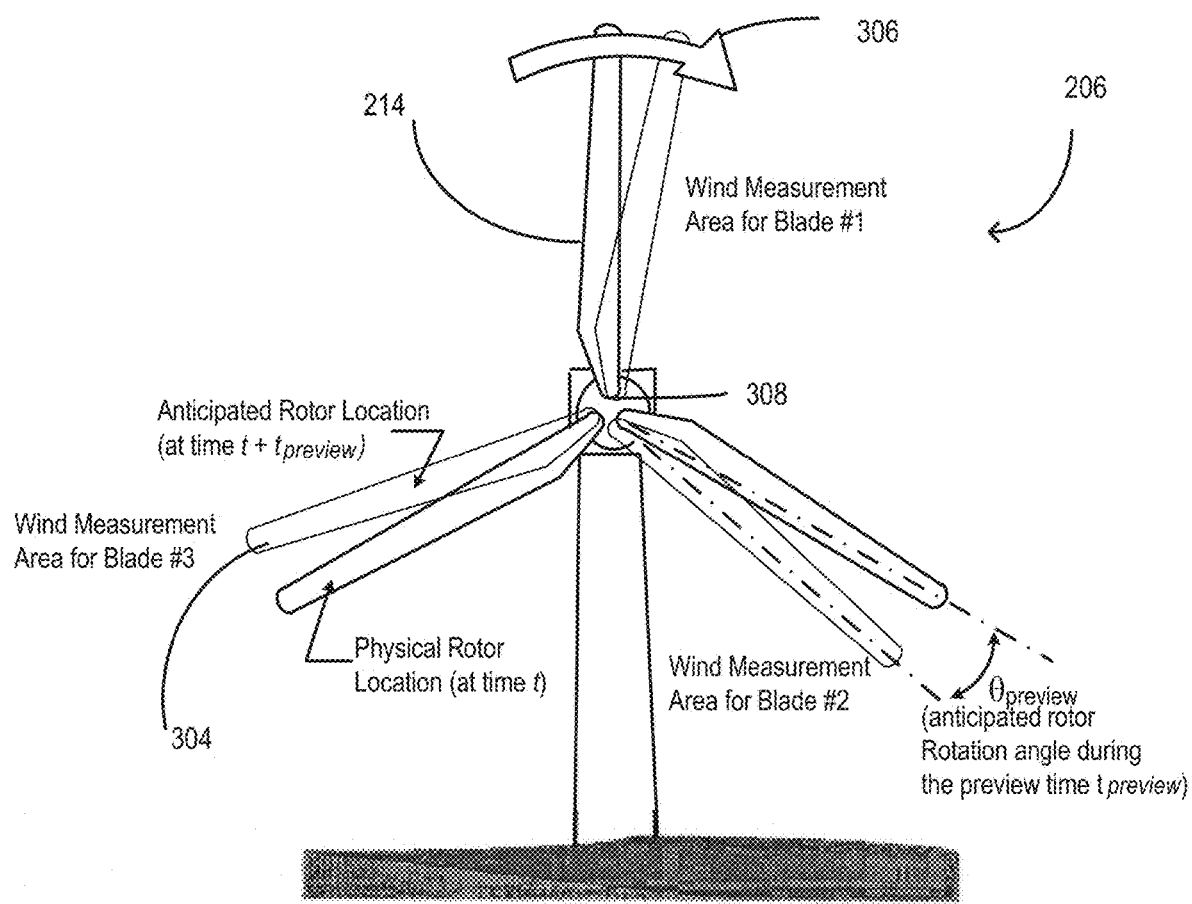
FIG. 3 is a diagram illustrating blade-specific wind monitoring for preview wind measurements in an embodiment.

A preview time is calculated based upon preview distance 220 and the local wind speed near the rotor plane 204 for the spatial region slightly ahead of the blade position (see region 304 in FIG. 3). The preview time varies with the turbine type, location and local wind conditions. The preview time may be adjusted for various dimensions of turbines, types of turbines, wind or air dynamics, the operational regime of the turbines, etc.

Generally, wind measurements taken at a greater distance from rotor plane 204, also referred to "long range", are primarily used for wind-field assessment—turbulence severity monitoring, shear measurements, etc. These ranges are typically greater than the distance for wind measurement to be provided to the control system for the wind turbine generator 206. Although only a small fraction of the wind field interacts with the blades, nacelle, and tower, and thus directly couples to the wind turbine generator (WTG), useful information may be extracted from an entire volumetric field of interest.

Referring to FIG. 2 again, volumetric region 222 is surrounded by lines 202A, 202B, a left portion of line 202C, 202D, and a left portion of line 202E, and is at distance from rotor plane 204. Region 222 is also referred to "long range region". Lidar measurements are performed in region 222 to produce long range wind data. The data in these long ranges provide important information on gusts, shear and other hazards and give important, advanced, warning of gusts and turbulent conditions.

Moreover, region 224 is surrounded by lines 202A, 202B, a right portion of line 202C and a right portion of line 202E and rotor plane 204 and is also referred as "short range region". The wind data in short range region 224 contains a preview of on-coming winds and are useful for feed-forward control of the WTG. The wind data in short range region 224 are important for the blade pitch and yaw control systems. Short range region 224 is close enough to wind turbine generator 206 to allow the control system a "feed forward" capability. This feed forward capability is directly tied to the preview time. Long range region 222 and short range region 224 may vary with the average wind speed. For example, the definitions of "long range" and "short range" both increase in distance when the average wind speed increases. The preview distance 220 is primarily determined by the WTG hardware and control algorithms, but can be adjusted due to local wind field conditions and the severity of on-coming gusts.

A laser radar (not shown) may be mounted at several locations near the turbine, such as the nacelle, the hub or the tower. However, the lidar system can only measure line-of-sight winds along the laser beam in each mounting location. It is increasingly difficult to measure winds that approach right angles across the laser beam, which results in a dead-zone (e.g. short range region 224), i.e. a region where a scanning lidar system does not measure the local wind field effectively. More specifically, in long range region 222, a single lidar system can effectively measure the wind field while the single lidar system cannot effectively measure the wind field in short range region 224. Therefore, propagating wind fields are estimated, based on measured winds in other parts of the wind field, without use of additional lidar systems for wind measurements. Short range region 224 is also labeled as "Wind Computational Volume" in FIG. 2. This estimation of wind field in short range region 224 is accomplished based on measuring the wind fields in longer range region 222, also labeled as "lidar Measurement Volume". The estimation method is based upon several measurements in long range region 222, such as horizontal and vertical shear, spatial structure of the wind field and its temporal characteristics.

The arrival time and severity of the gust or turbulent event are estimated from wind velocity measurements in long range region 222. Such estimations become more accurate as the wind event approaches rotor plane 204. Furthermore, the estimated winds near each blade 214 provide blade-specific wind data, which may be used in conjunction with WTG control algorithms in order to prevent damage to the WTG components, to reduce the loads to the WTG components, to reduce wear and fatigue of the WTG components and to optimize the net electrical power generated by the WTG. It is useful to provide real time wind speed data specific to each blade 214 for gust alleviation and blade pitch control. It is also useful to provide feed-forward and preview wind data to the WTG control algorithms. The wind data provide both wind velocity vector measurements including speed and direction and the associated arrival time when a wind event can be expected to impact a blade. For example, the wind data provides wind velocity at a specific impact time, such as the preview time associated with the feed-forward control algorithm. Range-resolved wind profiles are provided at each scan position to improve the spatial resolution of the measured wind field and increase the temporal speed of the data update rate. The wind field or data in long range region 222 are used to quantify the severity of gusts, shear and turbulence and to provide accurate estimates of the wind field in short range region 224, which is a portion of the wind field that can be acted upon by the WTG control algorithms.

In an embodiment, the blade-specific wind fields may be calculated based upon the wind data measured in long range region 222, which can reduce the cost for using multiple laser radars for providing blade-specific wind data.

In an alternative embodiment, wind profile scaling vectors may be applied to report the range-resolved wind data in order to reduce the volume of data transferred to the WTG control algorithm. For example, a rotor-diameter scaling factor may be applied to the range-resolved wind data to calculate the impact of a specific wind parcel on a specific location of blade 214. The aerodynamic collection efficiency of each blade and specific blade types, along the blade diameter, may be applied to the range-resolved wind data. Both blade-loading and rotor torque impact may be calculated using such scaling vectors.

FIG. 3 is a diagram illustrating blade-specific wind monitoring for preview wind measurements in an embodiment. FIG. 3 shows an anticipated rotor rotation in a preview time. A preview angle is an angle between the position of each blade 214 or rotor at time t and the anticipated position at a time $t+t_{preview}$, as illustrated in FIG. 3. A rate of blade rotation determines the blade position at the end of the feed-forward duration, or the preview time. The preview time is calculated based upon preview distance 220 and the local wind velocity in spatial region 304 ahead of the position of each blade 214. Wind measurement areas 304 for each blade are the areas blades 214 will rotate to in a direction pointed by arrow 306. The wind measurement areas 304 for each blade 214 are a portion of short range region 224 as illustrated in FIG. 2. For clarity, long range region 222 is not shown in FIG. 3.

Wind turbine generator (WTG) 206 does not react to all spatial and temporal scales equally. For example, large spatial scale wind fields are much larger than the rotor diameter or blade diameter and may appear to be laminar to WTG 206 and couple efficiently to WTG 206. On the other hand, small spatial scale wind fields are much smaller than the rotor diameter and are not energetic enough to significantly affect the WTG blades or tower. Likewise, large temporal scales appear as slowly-varying wind conditions, such that long-term temporal wind fields can be effectively managed with WTG control algorithms. However, very quickly varying temporal scales do not energetically couple to WTG 206. Thus, the impact of the wind fields on a wind turbine depends on the spatial and temporal scales of the wind fields, the turbine type and size, the rotor type and size, and the local wind speed. The lidar measurement range, preview time, and preview angle are critical to the performance of WTG 206. Such values need to be determined depending on, among others, the size of the turbine rotors, local wind conditions, currently-encountered wind speeds, levels of local turbulence and shear, and desired blade pitch rates for reduction in wear and fatigue of blade-pitch actuation components.

WTG 206 includes three operating regimes. A first Regime is for wind speeds below a minimum wind speed. A second Regime is for wind speeds above the minimum speed, but less than a threshold for power generation. A third Regime is for wind speeds at or above the threshold for power generation, but below a maximum safe operating wind speed. WTG 206 may process the range-resolved wind data differently, depending on the three operating regimes of WTG 20.

In a specific embodiment, sensor 308 is mounted in a turbine hub (not shown). A measurement optical axis is co-linear with turbine shaft 230 (see FIG. 2) such that the wind measurement coordinate is aligned to the wind vectors that have the greatest impact on blades 214. Single-angle conic, multi-angle conic and rosette scans may be economically generated to provide range-resolved wind measurements with small spatial resolution by using robust and cost-effective hardware.

In an alternative embodiment, the mounting location of the laser radar may vary, such as nacelle-mounting, turbine tower mounting and ground based mounting. The lidar system may simultaneously provide wind velocity, temperature and pressure measurements, such as Rayleigh/Mie lidar. Such lidar system may provide range resolved wind profiles, temperature, and pressure. Such lidar systems may also provide local Richardson Number and/or Reynolds Number information.

Figure 4:
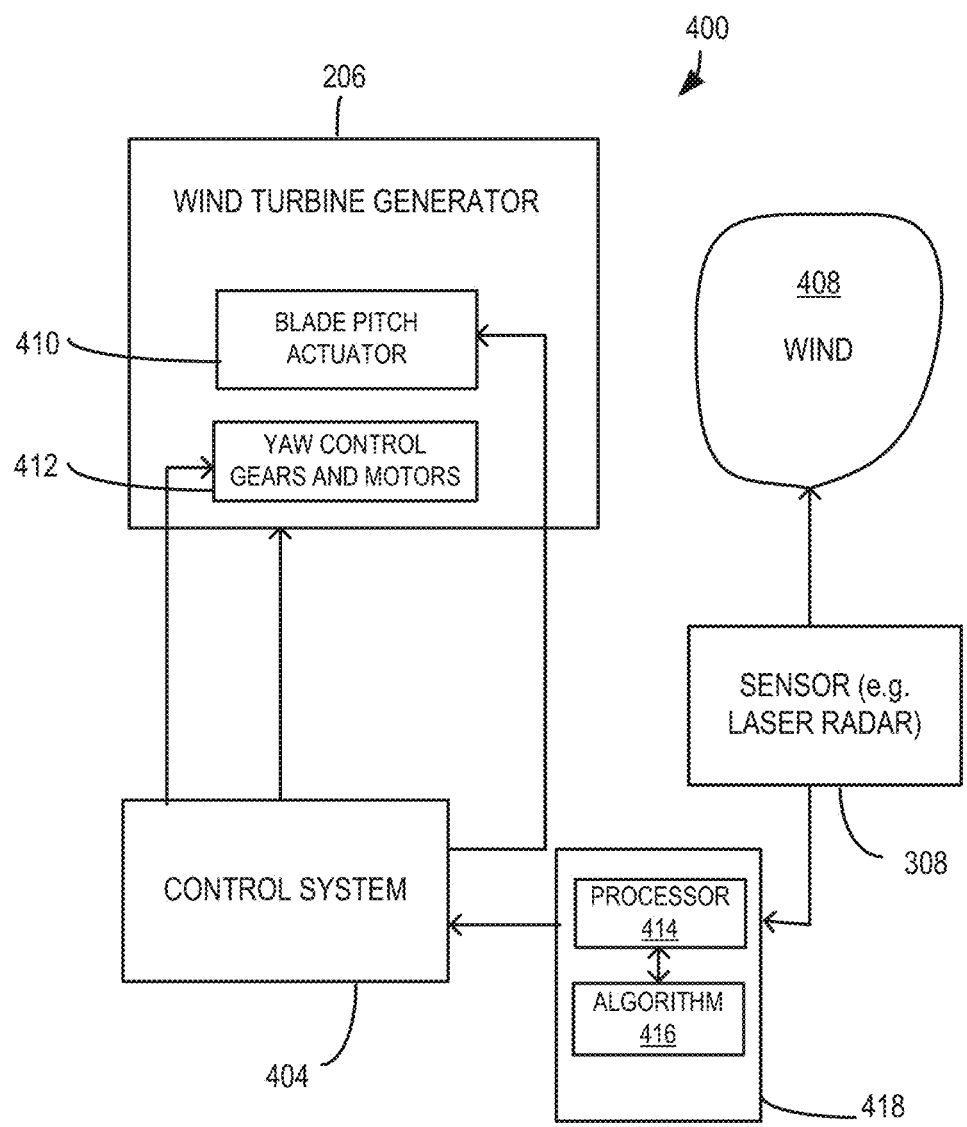
FIG. 4 is a simplified diagram of a system including a wind turbine generator, a sensor, and a control system in an embodiment.

FIG. 4 is a simplified system diagram in an embodiment. System 400 includes a wind turbine generator 206, which has yaw control gears and motors or yaw angle actuator 412 and blade pitch actuator 410. System 400 also includes a sensor 308 for monitoring wind field 408 near the wind turbine generator 206. System 400 further includes a control system 404 for controlling blade pitch actuator 410 and yaw control gears and motors 412 among other functions. System 400 also includes a computer system 418 with a processor 414 for analyzing the wind data from the sensor 308 with an algorithm 416. Computer system with processor 414 provides range-resolved wind data, which include wind data or wind fields in short range region 224 and long range region 222 of FIG. 2 as well as blade-specific wind data or wind fields, to control system 404.

Sensor 308 may be a lidar capable of providing various measurements, including wind velocity measurements, temperature measurements, and/or pressure measurements. Sensor 308 is coupled to processor 414 which is coupled to control system 404.

Control system 404 is operably coupled to wind turbine generator 206 for yaw control, blade pitch control and gust alleviation based upon the data analysis performed in processor 414 using the wind data measured with sensor 308, such as a lidar. Control system 404 is also coupled to yaw control gears and motors 412. Control system 404 may also be coupled to other input sensors (not shown) to receive information on feed-back control torque, tower strain, electric generator rotor speed and electric generator load. Control system 404 may include either feedback or feed-forward control of load, rotor speed, and electrical power generation of wind turbine generator 206. Herein, "feed-forward" control refers to control performed prior to occurrence of an event in anticipation of the event, as opposed to control performed after start of the event in reaction to the event.

Sensor 308 needs to be capable of monitoring an entire field of interest, which at least includes a cylindrical spatial volume defined by the area swept by the rotors or blades 214 over a length up-wind of the turbine, such as long range region 222 in FIG. 2, sufficient for gust detection and alleviation. The wind fields in the spatial volume need to be monitored with sufficient spatial resolution in order to monitor moderate-scale wind field events. The spatial resolution needs to be equal or smaller than approximately one-third of the rotor diameter. Preferably, the spatial resolution is one-tenth (or smaller) of the rotor diameter.

Sensor 308 also needs to be capable of monitoring the entire volumetric field with a sufficiently high sampling rate to capture the wind fields that couple efficiently to the WTG. To reduce power consumption, bulk, cost, wear and fatigue for blade pitch actuators 410 and yaw control gears and motors 412, a reaction time for control system 404 is typically limited to the order of approximately 1 second. Therefore, a minimum response time for the sensor is about one-third of a second, which provides a data update rate of at least 3 Hz. Faster update rates are preferred, especially during energetic gust events. If sensor or lidar 308 fails, WTG 206 does not fail, but will lose "feed forward" capability. Control system 404 may then operate in a reduced-capability mode that does not produce maximum efficiency for energy generation or approach higher blade loading levels.

WTG 206 may need to feather the blades for significant gusts. However, the maximum pitch rate is set by the blade pitch hardware. To increase the reliability and reduce fatigue, WTG 206 prefers to utilize slower blade pitch rates.

It is desirable to combine available wind measurements and techniques to provide the most accurate wind field assessments and arrival time predictions. More specifically, range-resolved wind data may be obtained by combining measured wind data in long range region 222 for wind field assessments and calculated wind data in short range region 224 near rotor plane 204 as well as calculated or measured blade-specific wind data. The range-resolved wind data in short range region 224 may be used by algorithms for gust alleviation and blade pitch control and yaw control.

Moreover, different spatial and temporal processing techniques may be used. Since the wind data are collected over the long range in real time, Taylor's "frozen turbulence" assumption may be used to cover those spatial regions not directly measured by the lidar scan pattern, such as short range region. Additionally, higher order temporal and spatial terms can be calculated to more accurately quantify flow field disturbances such as shear, turbulence, and gusts, especially near the rotor plane.

According to embodiments of the present disclosure, systems and methods are provided to monitor, classify, assess and detect on-coming wind conditions and hazards for modern wind turbines. The methods include monitoring the on-coming flow field with sufficient speed and spatial resolution for gust alleviation and blade-pitch control and yaw control of modern wind turbines. The methods also include performing data analyses at sufficient speeds, and at appropriate spatial locations.

Figure 5:
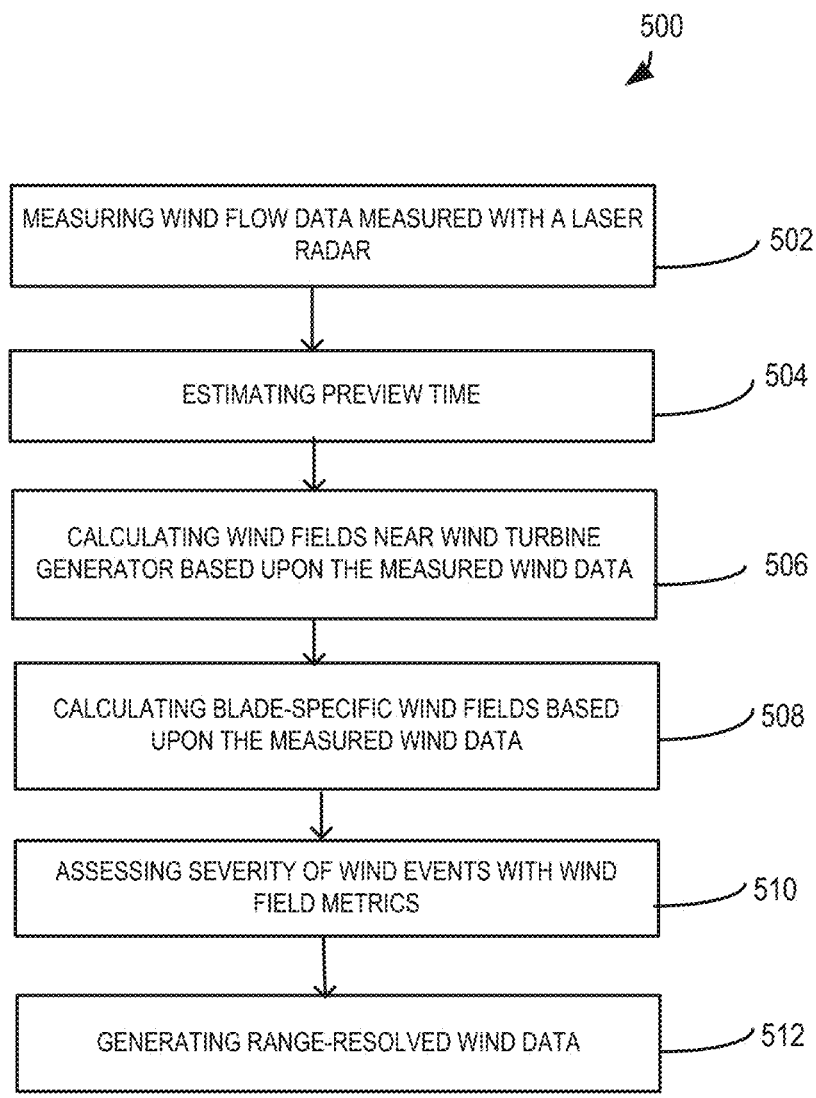
FIG. 5 is a flow chart for illustrating steps for generating range-resolved wind data.

FIG. 5 is a flow chart 500 illustrating steps for generating range-resolved wind data near a wind turbine generator. The method 500 starts with measuring wind data in long range region 222 measured with a laser radar 308 mounted on, or near, wind turbine generator 206 at step 502. The long range region is at a distance from a rotor plane of the wind turbine generator. The method 500 includes estimating preview time at step 504. The method 500 also includes step 506 of calculating wind fields in short range region 224 closer to the rotor plane of the wind turbine generator 206 based upon measured wind data in long range region 222. The method 500 also includes step 508 of calculating blade-specific wind field based upon measured wind data in long range region 222. The method also includes step 510 of assessing severity of wind events with wind field metrics. The method 500 further includes step 512 of generating the range-resolved wind data.

Figure 6:
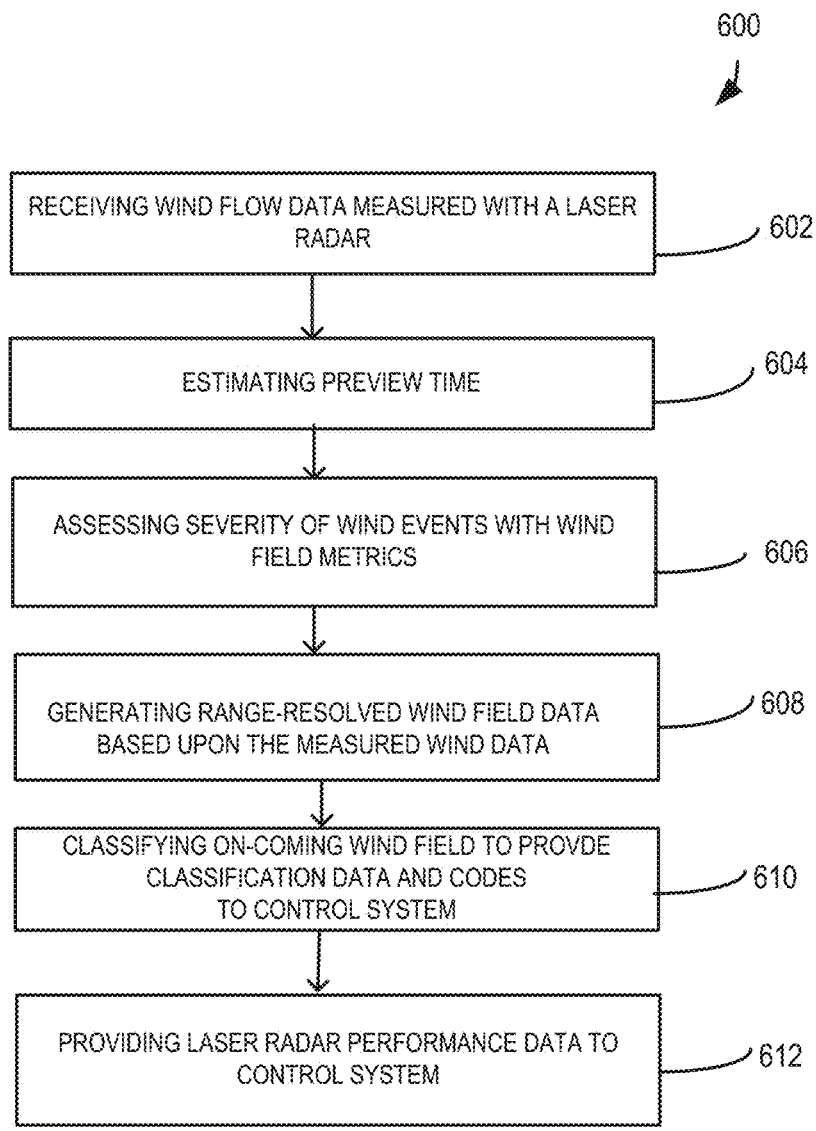
FIG. 6 is a flow chart for illustrating steps for providing classification data and code to a control system coupled to a wind turbine generator.

FIG. 6 is a flow chart 600 for illustrating steps for providing classification data and code to a control system coupled to a wind turbine generator. The method 600 starts with receiving range-resolved wind data at step 602 in a computer system with a processor 414. The method 600 includes estimating preview time at step 604. The method 600 also includes step 606 of assessing severity of wind events with wind field metrics. The method 600 further includes step 608 of generating the range-resolved wind data. The method also includes classifying on-coming wind field to provide classification data and codes to a control system at step 610. The method may also include lidar performance data to the control system at step 612.

Control system 404 uses the wind data in short range region 224 for adjusting blade pitch and yaw control to wind turbine generator 206 at step 506. Processor 414 also assesses severity of wind events with wind field metrics to provide the metrics to control system 404 at step 508. Processor 414 further classifies on-coming flow field to provide classification data and codes to control system 404 at step 510 and provide lidar performance data to control system at step 512.

Numerous scanning methods can be used to monitor and/or assess the entire volumetric field of interest or sub-sets of the entire volumetric field of interest. The scanning methods include azimuth scans and/or elevation scans, and/or a combination of azimuth and elevation scans from raster pattern scanners. Additionally, conic scans include a singular conic angle or multiple conic angles, and rosette scans performed by Risely prism scanners. Other scanning systems that may be used include, Micro-Opto-Electric Machine (MEMs) scanners, and scanning systems incorporating Holographic Optical Elements (HOEs), Diffractive Optical Elements (DOEs), and wedge prisms, etc.

Wind data may be reported in numerous coordinate systems, allowing differing WTG control algorithms or data reporting systems to address different operational issues. The coordinate systems may be an Earth-centered system based on local geospatial coordinates, or turbine-centered system based on a reference located on the turbine, i.e. at the intersection of the turbine rotor shaft and the rotor plane. Numerous methods and metrics can be used to detect, monitor and assess the wind field.

Wind field data products include wind field metrics, classification data and codes and lidar-specific performance data. By using the wind field metrics, wind fields in short range region 224 and blade specific data are estimated by using measured wind flow data in long range region 222 from a single lidar 308. The wind field metrics include the following:

(1) A velocity of a wind parcel, such as a sector to be encountered by a turbine blade, and an associated arrival time of the wind parcel to impact the blade,
(2) The range-resolved wind velocity profile, including a maximum wind speed,
(3) A first moment of the range-resolved velocity measurement (i.e., the average wind),
(4) A second moment of the range-resolved velocity measurement (i.e., the standard deviation, or lidar spectral width, of the measured wind profile),
(5) An eddy dissipation rate, calculated or estimated from the wind field parameters,
(6) A velocity structure function average ($[v(r+\Delta r)-v(r)]^2$), where $v(r)$ is the wind velocity measured at range $r$, and $\Delta r$ is the local spatial resolution, or an alternate form of the velocity structure function average ($[(v(r+\Delta r)-v(r))/\Delta r]^2$),
(7) A velocity gradient $\nabla v(r)$, or a magnitude of the velocity gradient $|\nabla v(r)|$ or $(\nabla v(r))^2$, and ensemble averages of these gradient-based metrics,
(8) Atmospheric stability metrics based on measured temperature profiles, such as the temperature gradient $\nabla T(r)$, where $T(r)$ is the measured temperature profile, or the Richardson Number, Ri,
(9) Atmospheric flow regime metrics based on localized velocity, temperature and pressure measurements, such as Reynolds Number, and
(10) Rotor weighting function or vector $V(r)$ which compensates for the impact of the wind parcel on the blade.

The wind field metrics may be evaluated in Earth-centered ($x, y, z$) coordinates, or spherical coordinates ($\rho, \theta, \varphi$), cylindrical coordinates ($\varphi, r, l$) or along blade-specific directions ($r, \varphi$). The wind field metrics may be calculated for those sub-sections of the wind field that ultimately impact the blades. The wind field metrics may be multiplied by, or compensated with the rotor weighing function. For example, weighting functions or vectors may be applied to the range-resolved wind data to calculate the effective blade loading and/or the torque delivered to each blade. In Earth-centered, turbine-centered or blade-specific coordinate systems, and over all portions, or sub-portions, of the volumetric field of interest, wind field metrics may be used to detect, monitor and assess the wind field. For example, these wind field metrics may be modified to correct for diameter-dependent rotor performance or to correct for lidar performance, such as lidar signal level or lidar signal-to-noise ratio (SNR). The wind field metrics can be used to assess the type, severity and impact of the wind field. Such wind field metrics provide wind field classifications to assist the WTG 206 to select among various control algorithms and methods.

The classification data and codes may be developed and delivered to the WTG for control purposes. The classification data and codes include the following:
 (1) type and severity of the range-resolved wind field, including horizontal, vertical, blade-wise shear, and blade-to-blade shear data,
 (2) loading and/or variability on each blade resulting from the blade-specific wind field,
 (3) rotor torque and/or variability delivered by each blade resulting from the blade-specific wind field,
 (4) severity, arrival time, and spatial characteristics for gusts,
 (5) temporal characteristics of the range-resolved wind field, such as arrival times for on-coming gusts, hazards or flow variations, and
 (6) spatial characteristics of the range-resolved wind field, such as wind field variability as a function of yaw direction or blade position.

Wind field data products may include any of the above-mentioned metrics and classification data/codes. In addition, lidar-specific performance data may be included.

The lidar-specific performance data include (1) data validity that includes 0 and 1 for data determined to be invalid and valid respectively, (2) lidar hardware and software operating status codes, including failure codes from Built-in-Test results, (3) lidar maintenance codes, such as dirty window or insufficient power supply, and (4) lidar performance characteristics, such as signal strength or signal-to-noise ratio (SNR), lidar sensitivity degradation due to weather such as snow and rain.

The methods and system provide a low cost alternative to wind measurement systems having multiple lidars. Wind data in long range region can be measured with a single lidar. Wind data in short range region can be calculated based upon the wind data measured in the long range. The range-resolved wind data, which includes the wind data in both long range region and short range region as well as blade-specific wind data, help the wind turbine generators perform effective gust alleviation, blade pitch control and yaw control to reduce structural fatigue and damage, to protect expensive turbines from severe but brief and fast moving wind events and to improve reliability and to enhance energy capture efficiency.

Figure 7:
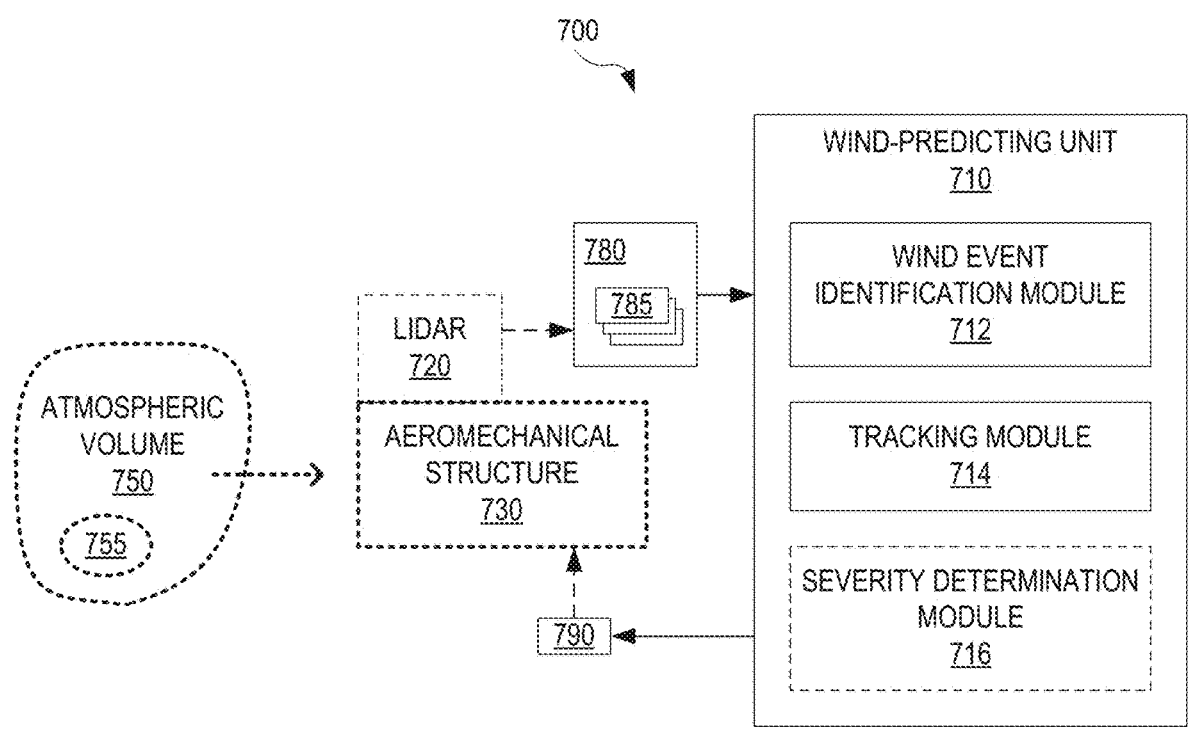
FIG. 7 illustrates a system for predicting arrival of a wind event at an aeromechanical structure, according to an embodiment.

FIG. 7 illustrates one exemplary system 700 for predicting arrival of a wind event 755 at an aeromechanical structure 730. Herein, an "aeromechanical structure" refers to a structure, the operation of which utilizes the surrounding air, or other gases, through mechanical coupling therewith. Specifically, aeromechanical structure 730 couples with an atmospheric volume 750 generally moving towards aeromechanical structure 730. Aeromechanical structure 730 is, for example, a wind turbine or an aircraft. In the example of a wind turbine, atmospheric volume 750 is an air volume generally moving towards the wind turbine. In the example of an aircraft, atmospheric volume 750 is the volume of air that the aircraft is moving towards when the aircraft is in flight. Seen from the reference frame of the aircraft, atmospheric volume 750 is generally moving towards the aircraft when the aircraft is in flight. Without departing from the scope hereof, atmospheric volume 750 may also have a velocity relative to ground, such that atmospheric volume 750 approaches the aircraft at an angle to the travel direction of the aircraft.

System 700 includes a wind-predicting unit 710 that processes a time series 780 of a set of spatially distributed wind velocity measurements 785 of atmospheric volume 750 to estimate arrival information 790 for wind event 755 at aeromechanical structure 730. Each set of spatially distributed wind velocity measurements 785, i.e., each time point of time series 780, includes a plurality of measurements of wind velocity at a respective plurality of different spatial locations in atmospheric volume 750. Each set of spatially distributed wind velocity measurements 785 is measured at a different time. Wind measurements in long range region 222, as discussed in reference to FIGS. 2, 5, and 6, are an example of spatially distributed wind velocity measurements 785. Wind-predicting unit 710 utilizes time series 780, as opposed to a single time point, to obtain a history of wind velocities in atmospheric volume 750. From this history of wind velocities, wind-predicting unit 710 extrapolates into future time to predict arrival of wind event 755 at aeromechanical structure 730. Since system 700 utilizes the history of wind velocities in atmospheric volume 750, system 700 is capable of accounting for complex wind field dynamics. For example, system 700 may account for the packet velocity, or phase speed, of wind event 755 being different from the directly measured wind velocity within wind event 755. This provides for accurate prediction of arrival of wind event 755 at aeromechanical structure 730.

Although shown in FIG. 7 as including three sets of spatially distributed wind velocity measurements 785, time series 780 may include two, four, or more sets of spatially distributed wind velocity measurements 785. Herein, "spatially distributed wind velocity measurements" refer to wind velocity measurements that are spatially distributed over a three-dimensional volume and that are not necessarily confined to a straight line or a plane.

Wind-predicting unit 710 includes a wind event identification module 712 and a tracking module 714. In certain embodiments, wind-predicting unit 710 also includes a severity determination module 716. Wind event identification module 712 processes time series 780 to determine the presence of wind event 755. In certain embodiments, wind event identification module 712 also determines the type of wind event 755. For example, wind event identification module 712 determines the presence of a wind event 755 that is a vertical shear, a horizontal shear, a cohesive packet of wind structure ("turbule"), a gust, or a combination thereof. Without departing from the scope hereof, wind event identification module 712 may identify a plurality of wind events 755 associated with a respective plurality of arrival information 790. Tracking module 714 tracks wind event 755, based upon time series 780, to estimate arrival information 790 for wind event 755. Arrival information 790 may include at least one of the estimated arrival time of wind event 755 at aeromechanical structure 730 and the type of wind event 755. Arrival information 790 may further include a severity metric that indicates the severity of impact of wind event 755 on aeromechanical structure 730. In certain embodiments, arrival information 790 includes estimated spatial information such as speed, direction, spatial extent, and spatial structure for wind event 755.

It is understood that, for wind events 755 of extended duration, the arrival time may refer to a time at which a property of wind event 755 arrives at aeromechanical structure 730, such that system 700 continuously, or regularly, provides updated predictions about wind event 755 at aeromechanical structure 730. Likewise, wind event 755 may refer to the return to normal wind conditions after a wind event that deviates from normal wind conditions.

In one embodiment, system 700 further includes a lidar 720 that generates time series 780. Lidar 720 is located at aeromechanical structure 730, for example on or in aeromechanical apparatus, or near aeromechanical structure 730, such that lidar 720 is in optical communication with atmospheric volume 750. Lidar 720 may be configured to measure wind velocities along the line-of-sight of the laser beam of lidar 720. Lidar 720 may include one or more features described above with respect to sensor 308. The laser beam of lidar 720 has a varying direction so as to obtain spatially distributed wind velocity measurements 785. In another embodiment, system 700 does not include 720 but is configured to receive time series 780 from a third lidar that may be similar to lidar 720.

System 700 may predict the arrival of wind event 755 several seconds prior to arrival of wind event 755. In one example, aeromechanical structure 730 is a wind turbine, and system 700 produces arrival information 790 at least three to five seconds prior to arrival of wind event 755 at the wind turbine. This allows for adjustment of the operation of the wind turbine over at least three to five seconds. Such adjustment may include changing the pitch of one or more rotor blades of the wind turbine. Prior art wind measurement systems generally only allow about one second for adjustment of the operation of the wind turbine, which causes significant structural fatigue of the mechanical parts of the wind turbine. The wind turbine industry therefore prefers wind event arrival prediction at least three to five seconds prior to the actual arrival. System 700 is capable of predicting the arrival time, of wind event 755 at aeromechanical apparatus, three to five seconds ahead of the actual arrival and with a precision of about 0.1 seconds or better. In the example of a wind turbine, this allows for adjustment of the wind turbine with minimal structural fatigue, and minimal damage of the mechanical parts of the wind turbine, while also providing the accuracy required for optimal operation efficiency during wind event 755.

Figure 8:
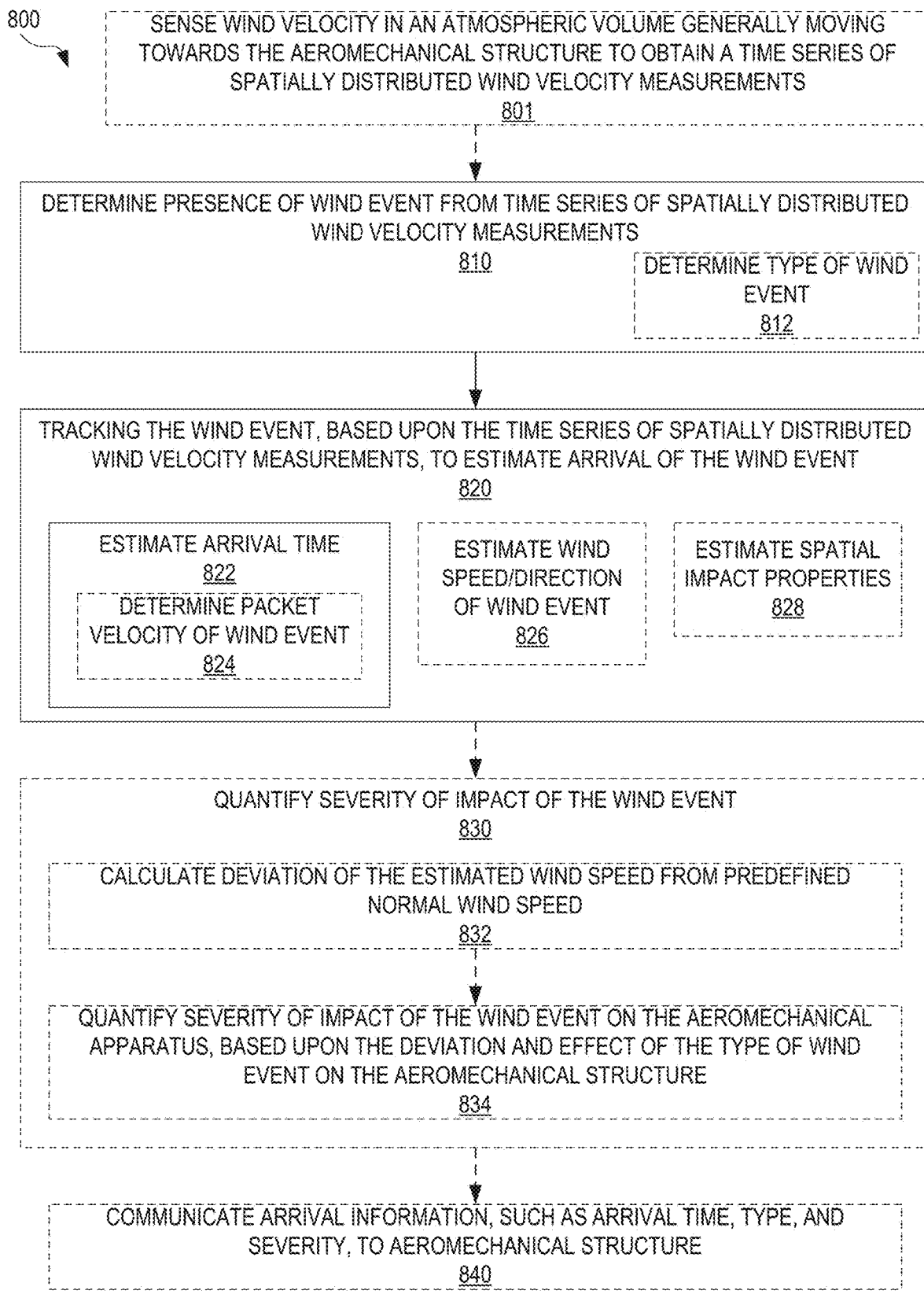
FIG. 8 illustrates a method for predicting arrival of a wind event at an aeromechanical structure, according to an embodiment.

FIG. 8 illustrates one exemplary method 800 for predicting arrival of a wind event 755 at aeromechanical structure 730. Method 800 may be performed by system 700.

In one embodiment, method 800 includes a step 801 of using a lidar, placed at aeromechanical structure 730, to repeatedly scan atmospheric volume 750 to obtain time series 780. The lidar obtains measurements at a plurality of positions along the general propagation direction of atmospheric volume 750, and at a plurality of positions in each of at least one plane perpendicular to the general propagation direction of atmospheric volume 750. In one example of step 801, lidar 720 repeatedly scans atmospheric volume 750 to obtain time series 780. In another embodiment, method 800 receives time series 780 but does not include step 801 of generating time series 780.

Step 801 may utilize one or more of a variety of scanning methods to monitor and/or assess atmospheric volume 750. Such scanning methods include azimuth scans and/or elevation scans, and/or a combination of azimuth and elevation scans from raster pattern scanners. Additionally, conic scans include a singular conic angle or multiple conic angles, and rosette scans performed by a Risely prism scanner. Other scanning systems that may be used in step 801 include Micro-Opto-Electric Machine (MEMs) scanners, and scanning systems incorporating Holographic Optical Elements (HOEs), Diffractive Optical Elements (DOEs), and wedge prisms, etc.

In one embodiment, the lidar scans the full volume of atmospheric volume 750. In another embodiment, the lidar scans only one or more surfaces in atmospheric volume 750. A full volume scan may require multiple lidars in order to achieve a required scan rate, whereas a surface scan may be performed by a single lidar and still provide sufficient data to predict arrival of wind event 755. When step 801 utilizes a surface scan, the lidar may scan this surface at a high rate, thereby providing data of high temporal resolution. High temporal resolution is beneficial for accurately predicting the arrival time of wind event 755 at aeromechanical structure 730.

In step 810, method 800 determines the presence of wind event 755 from time series 780. In certain embodiments, step 810 includes a step 812 of determining the type of wind event 755. For example, step 812 determines that wind event 755 is a vertical shear, a horizontal shear, a vertical gust, a horizontal gust, a turbule, or a combination thereof. In one example of step 810, wind event identification module 712 processes time series 780 to determine the presence, and optionally type, of wind event 755, as discussed in reference to FIG. 7.

In a step 820, method 800 tracks wind event 755, based upon time series 780, to estimate arrival of wind event 755 at aeromechanical structure 730. In one embodiment, method 800 performs step 820 when wind event 755 is determined in step 810. In one example of step 820, tracking module 714 estimates the arrival of wind event 755 based upon time series 780, as discussed in reference to FIG. 7. Step 820 includes a step 822 of estimating the arrival time of wind event 755 at aeromechanical structure 730. Step 822 may include at step 824 of determining the packet velocity of wind event 755 in order to deduce the arrival time therefrom. As discussed in reference to FIG. 7, determination of the packet velocity of wind event 755 improves the accuracy of arrival information 790. Step 820 may further include a step 826 of estimating the wind direction and/or wind speed associated with wind event 755. Additionally, step 820 may include a step 828 of estimating other spatial impact properties, such as spatial extent, and spatial structure for wind event 755. It is understood that wind direction and/or wind speed may vary across wind event 755, and that wind direction/speed of wind event 755 may be spatially or temporally dependent.

Without departing from the scope hereof, step 820 may estimate other properties of wind event 755. Properties of wind event 755 estimated in step 820 may include one or more of the following:

(1) Velocity of a wind parcel associated with wind event 755, such as a wind parcel about to impact aeromechanical structure 730, and an associated arrival time of the wind parcel.
(2) The spatially resolved wind velocity profile for wind event 755.
(3) Maximum wind speed for wind event 755.
(4) A first moment of the spatially resolved wind velocity profile (i.e., the average wind velocity) for wind event 755.

(5) A second moment of the spatially resolved wind velocity profile (i.e., the standard deviation, or lidar spectral width, of the measured wind profile) for wind event 755.
(6) An eddy dissipation rate for wind event 755.
(7) A velocity structure function average $[v(r+\Delta r)-v(r)]^2$ for wind event 755, where $v(r)$ is the wind velocity measured at range r, and $\Delta r$ is the local spatial resolution, or an alternate form of the velocity structure function average $[(v(r+\Delta r)-v(r))/\Delta r]^2$.
(8) A velocity gradient $v(r)$, or a magnitude of the velocity gradient $|\nabla v(r)|$ or $(\nabla v(r))^2$, for wind event 755 and ensemble averages of these gradient-based metrics.
(9) Atmospheric stability metrics associated with wind event 755 and based upon measured temperature profiles, such as the temperature gradient $T(r)$, where $T(r)$ is the measured temperature profile, or the Richardson Number, Ri.
(10) Atmospheric flow regime metrics associated with wind event 755 and based upon localized velocity, temperature and pressure measurements, such as Reynolds Number.
(11) A mechanical energy dissipation rate $$\varepsilon = 2\nu\left\{\left\langle\left(\frac{\partial u_i}{\partial x_k}\right)^2 + \frac{\partial u_i}{\partial x_k}\frac{\partial u_k}{\partial x_i}\right\rangle\right\}$$

for wind event 755, wherein $\nu$ is kinematic viscosity, $u_i$ and $x_i$ are component velocities and directions, respectively. Summation over repeated indices (axes) is assumed and the brackets denote spatial averages.
(12) An n'th moment of the spatially resolved wind velocity profile for wind event 755, defined as $\zeta_n = \langle[\delta u(r)]^n\rangle = C_n \epsilon^{n/3} r^{n/3}$ wherein $\delta u(r) = u(x+r) - u(x)$, and r denotes a spatial displacement from x.

In certain embodiments, method 800 includes a step 830 of quantifying severity of impact of wind event 755 on aeromechanical structure 730. Step 830 is performed by severity determination module 716, for example. Step 830 includes a step 832 of calculating the deviation of the wind speed, associated with wind event 755 and estimated in step 826, from a predefined normal wind speed. Step 832 further includes a step 834 of quantifying the severity of impact of wind event 755 on aeromechanical structure 730, based upon (a) the deviation determined in step 832 and (b) the effect of the type of wind event 755 on aeromechanical structure 730. Step 834 may utilize knowledge of properties of aeromechanical structure 730, such as the torque or loading associated with impact of wind event 755 on a certain spatial portion of aeromechanical structure 730. For example, in the case of a wind turbine, the severity of impact of wind event 755 on a rotor blade of the wind turbine is greater near the tip of the rotor blade than near the nacelle of the wind turbine. In this example, step 834 may utilize a rotor weighting function or vector as discussed above.

In an optional step 840, method 800 communicates arrival information 790 to aeromechanical structure 730. Arrival information 790 may include data determined in steps 810, 820, and/or 830, such as arrival time for wind event 755, type of wind event 755, and/or severity of impact of wind event 755 on aeromechanical structure 730. In one example of step 840, wind-predicting unit 710 communicates arrival information 790 to aeromechanical structure 730.

System 700 may repeat method 800, for example at regular intervals, to update arrival information 790.

FIGS. 9A and 9B illustrate one exemplary scenario, wherein lidar 720 measures wind velocities for an atmospheric volume 750 generally moving towards a wind turbine 930. Atmospheric volume 750 is generally moving towards wind turbine 930, as indicated by arrows 950. Although arrows 950 are shown as being straight, it is understood that individual wind parcels of atmospheric volume 750 may propagate along paths that are not straight. Wind turbine 930 is an embodiment of aeromechanical structure 730, and includes a nacelle 934 and a plurality of rotor blades 932. Wind turbine 930 may include one, two, three, or more rotor blades 932. For clarity of illustration, not all rotor blades 932 are labeled in FIGS. 9A and 9B. Lidar 720 is mounted on or in nacelle 934 and is in optical communication with atmospheric volume 750. Lidar 720 scans a conic surface 960 in atmospheric volume 750. Wind turbine 930 is, for example, WTG 206.

FIG. 9A shows wind turbine 930 and conic surface 960 in a perspective view along a horizontal viewing direction that is nearly parallel to the rotor plane 940 of wind turbine 930. A coordinate system 905 defines the general propagation direction of atmospheric volume 750 as being along the x-axis, while rotor plane 940 is in the y-z plane. FIG. 9B shows the projection of conic surface 960 onto rotor plane 940 of wind turbine 930. FIGS. 9A and 9B are best viewed together.

As wind parcels of atmospheric volume 750 propagate towards wind turbine 930, for example as indicated by arrows 950, these wind parcels pass through conic surface 960. Thus, wind velocity measurements made by lidar 720 across conic surface 960 include wind velocity measurements of these wind parcels. Conic surface 960 has a maximum diameter 972 at length 990 along the x-axis from lidar 720. Diameter 972 is at least as large as the diameter 980 of rotor plane 940. Wind parcels indicated by arrows 950(i) pass through cone at positions 952(i) projected onto the y-z plane.

In one example, diameter 972 is in the range from 50 to 200 meters, and length 990 is in the range from 100 to 400 meters.

In an embodiment, wind turbine 930 utilizes system 700 and method 800 to determine spatial structure of wind event 755, in the y-z plane, at a resolution no courser than one third or one fourth of diameter 980.

FIG. 10 illustrates one exemplary scenario, wherein lidar 720 measures wind velocities for an atmospheric volume 750 generally moving towards an aircraft 1030, as viewed from the reference frame of aircraft 1030. The scenario of FIG. 10 is similar to the scenario of FIGS. 9A and 9B, except for being applicable to an aircraft instead of a wind turbine. Lidar 720 is mounted on or in aircraft 1030 and is in optical communication with atmospheric volume 750. Rotor plane 940 is replaced by a geometric surface 1040 located at aircraft 1030. FIG. 10 represents a similar view as that of FIG. 9A.

In an embodiment, aircraft 1030 utilizes system 700 and method 800 to determine spatial structure of wind event 755, along the x-axis, at a resolution no courser than half the length 1080 of aircraft 1030.

FIGS. 11A-D illustrate exemplary scanning surface geometries that may be used by lidar 720 to perform step 801 of method 800. Each of FIGS. 11A-D shows the respective scanning surface as a cross section in the y-z plane (see coordinate system 905). Although not visible in FIGS. 11A-D, each of these scanning surfaces is conically expanding from the location of lidar 720.

Figure 11A:
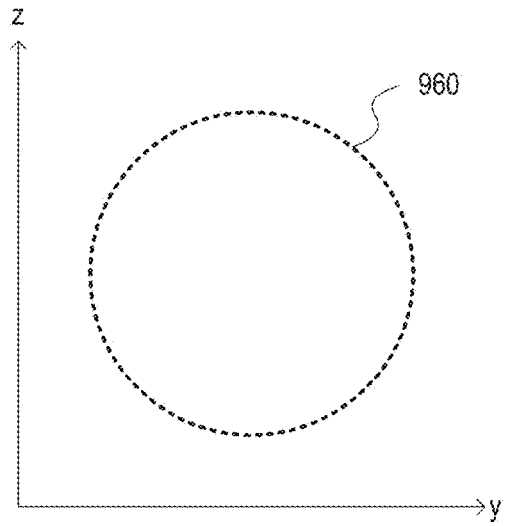
FIGS. 11A-11D illustrate exemplary scanning surface geometries that may be used by a lidar to perform measurements according to the method of FIG. 8.

FIG. 11A illustrates conic surface 960. Conic surface 960 is particularly well-suited for measurement of zonal winds, i.e., wind events with velocities primarily in the x-direction. Conic surface 960 also measures wind velocities with component(s) in the y-z plane. Wind turbines are particularly sensitive to zonal winds, but horizontal winds in the y-z plane may cause severe damage to a wind turbine if not properly adjusted in anticipation of the impact. Therefore, system 700 may advantageously apply conic surface 960 to measure time series 780 when aeromechanical structure 730 is a wind turbine.

Figure 11B:
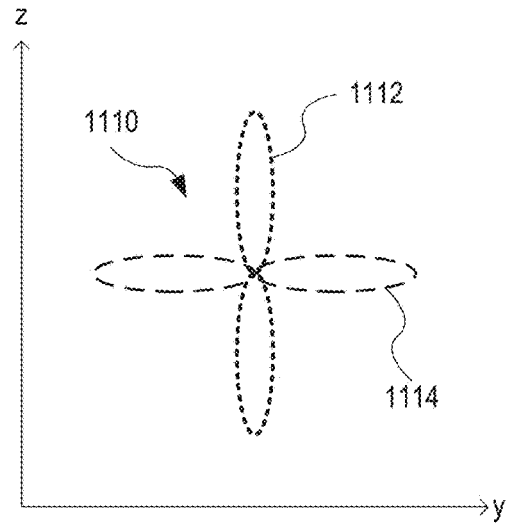

FIG. 11B illustrates one exemplary radially expanding rosette surface 1110 with a predominantly vertically oriented surface portion 1112 and a predominantly horizontally oriented surface portion 1114. Without departing from the scope hereof, radially expanding rosette surface 1110 may include more surface portions than shown in FIG. 11B and/or have surface portion orientations different from those shown in FIG. 11B. Radially expanding rosette surface 1110 is well-suited for measurement of wind events associated with high wind speed in the y-z plane. Since aircrafts are particularly sensitive to cross-winds, system 700 may advantageously apply radially expanding rosette surface 1110 to measure time series 780 when aeromechanical structure 730 is an aircraft.

Figure 11C:
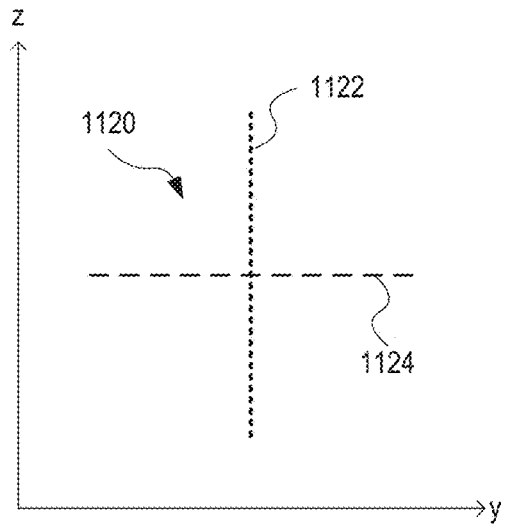

FIG. 11C illustrates one exemplary radially expanding cross-hair shaped surface 1120 with a predominantly vertically oriented surface portion 1122 and a predominantly horizontally oriented surface portion 1124. Without departing from the scope hereof, radially expanding cross-hair shaped surface 1120 may include more surface portions than shown in FIG. 11C and/or have surface portion orientations different from those shown in FIG. 11C. For the same reasons as stated in reference to FIG. 11B, radially expanding cross-hair shaped surface 1120 is advantageously employed by system 700 when implemented on an aircraft.

Figure 11D:
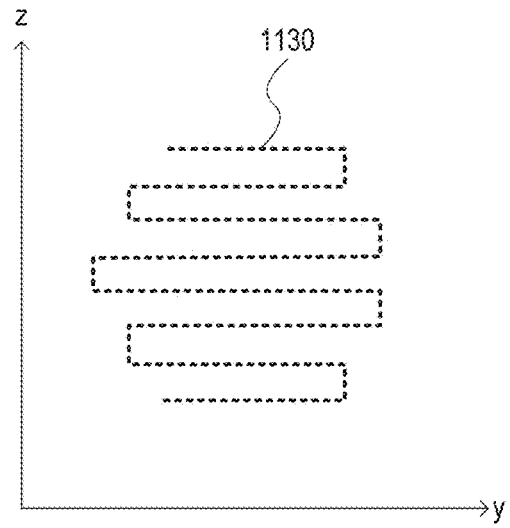

FIG. 11D illustrates one exemplary radially expanding raster-scan surface 1130. Radially expanding raster-scan surface 1130 provides relatively dense spatial coverage of atmospheric volume 750 to obtain a more complete direct measurement of wind velocities in spatially distributed wind velocity measurements 785.

Figure 12:
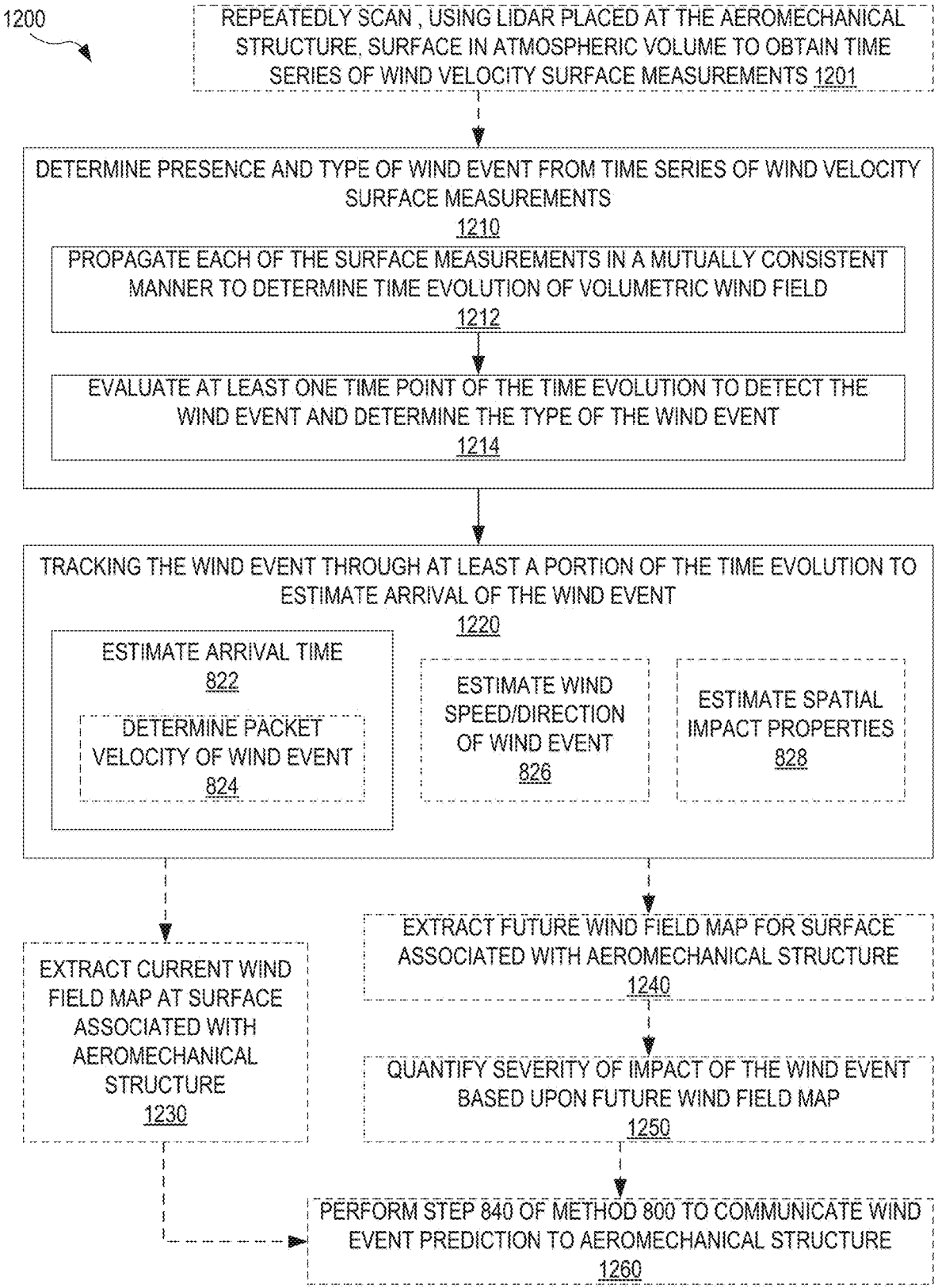
FIG. 12 illustrates a method for determining a time evolution of a full volumetric wind map for an atmospheric volume generally moving towards an aeromechanical structure to predict arrival of a wind event at the aeromechanical structure, according to an embodiment.

FIG. 12 illustrates one exemplary method 1200 for predicting arrival of wind event 755 at aeromechanical structure 730. Method 1200 determines a time evolution of a full volumetric wind map for atmospheric volume 750 to predict arrival of wind event 755 based upon this full volumetric wind map. Method 1200 is an embodiment of method 800.

In one embodiment, method 1200 includes a step 1201 of using a lidar, placed at aeromechanical structure 730, to repeatedly scan a surface in atmospheric volume 750 to obtain a time series 780 of wind velocity surface measurements across this surface. These wind velocity surface measurements are embodiments of spatially distributed wind velocity measurements 785. In an embodiment, step 1201 measures wind velocities only along the line-of-sight of the lidar beam. In one example of step 1201, lidar 720 repeatedly scans a surface, such as one of surfaces 960, 1110, 1120, and 1130, in atmospheric volume 750 to obtain time series 780. In another example of step 1201, lidar 720 repeatedly scans a subset of one of surfaces 960, 1110, 1120, and 1130, for example excluding the surface portion closest to aeromechanical structure 730. In another embodiment, method 1200 receives time series 780 but does not include step 1201 of generating time series 780. Step 1201 is an embodiment of step 801 of method 800.

In a step 1210, method 1200 determines the presence and type of wind event 755 from time series 780 of wind velocity surface measurements. Step 1210 is performed by wind event identification module 712, for example.

Step 1210 includes steps 1212 and 1214. In step 1212, method 1200 propagates each of the wind velocity surface measurements, through space and time, in a mutually consistent manner. This propagation is performed in a fashion that ensures optimal consistency between the different time points of time series 780. For example, for each time point, the wind velocity surface measurements associated with the time point are propagated in space and time to optimally agree with the wind velocity surface measurements for the next time point. This propagation results in the determination of a time evolution of the full volumetric wind field associated with atmospheric volume 750. Propagation of the wind velocity surface measurements is not restricted to the frozen turbulence assumption, and step 1212 may propagate different portions of atmospheric volume 750 at different speeds and in different directions to achieve optimal consistency between the wind velocity surface measurements obtained at different times.

In step 1214, method 1200 evaluates at least one time point of the time evolution of the full volumetric wind field to detect wind event 755 and determine the type of wind event 755. Step 1214 may utilize one or more of properties (1) through (12) to determine the type of wind event 755. In one example, a vertical shear is identified from an upper portion of the volumetric wind field having higher zonal wind speed than a lower portion of the volumetric wind field.

In a step 1220, method 1200 tracks wind event 755 through at least a portion of the time evolution of the full volumetric wind field, determined in step 1210, to estimate arrival of wind event 755 at aeromechanical structure 730. In one embodiment, method 1220 performs step 1220 when wind event 755 is determined in step 1210. Step 1220 is performed by tracking module 714, for example. Step 1220 is an embodiment of step 820 of method 800.

Step 1220 includes step 822, and optionally includes one or more of step 824, 826, and 828. When implemented in step 1220, steps 822, 824, 826, and 828 are performed based upon tracking of wind event 755 through at least a portion of the time evolution of the full volumetric wind field. Properties of wind event 755 estimated in step 1220 may include one or more of properties (1) through (12) discussed in reference to FIG. 8.

In an embodiment, method 1200 includes a step 1240 of extracting, from the time evolution of the full volumetric wind field, at least one future wind field map for a surface associated with aeromechanical structure 730, such as rotor plane 940, a geometric surface that is coplanar with rotor plane 940, or geometric surface 1040. Each of the at least one future wind field map indicates the estimated wind field, for example the three-dimensional velocity or the zonal wind velocity, at the surface associated with aeromechanical structure 730 at a future time point. In one example, step 1240 produces a set of future wind field maps for a duration after the current time, such as a future wind field map for every 0.1 seconds after the current time for at duration of at least three or five seconds. In another example, step 1240 produces one or more future wind field maps for a time that is at least three to five seconds out in the future.

Optionally, method 1200 includes a step 1250 of quantifying the severity of impact of wind event 755 on aeromechanical structure 730 based upon at least one of the future wind field maps. Step 1250 is an embodiment of step 830, which is based upon the at least one future wind field map. Step 1250 may implement steps 832 and 834, as discussed in reference to FIG. 8.

In an embodiment, method 1200 includes a step 1230 of extracting, from the time evolution of the full volumetric wind field, a current wind field map for the surface associated with aeromechanical structure 730, using the same method as described in reference to step 1240. The current wind field map indicates the estimated wind field, for example the three-dimensional velocity or the zonal wind velocity, at the surface associated with aeromechanical structure 730 at the current time.

Each of steps 1230, 1240, and 1250 may be performed by wind-predicting unit 710.

In an optional step 1260, method 1200 communicates arrival information 790 to aeromechanical structure 730. Arrival information 790 may include data determined in steps 1210, 1220, 1230, 1240, and 1250, such as arrival time for wind event 755, type of wind event 755, severity of impact of wind event 755 on aeromechanical structure 730, future wind field map(s), and/or the current wind field map. In one example of step 1240, wind-predicting unit 710 communicates arrival information 790 to aeromechanical structure 730.

An aeromechanical structure, such as aeromechanical structure 730 or aeromechanical structure 2340 (see FIG. 23), may utilize both the current wind field map (determined in step 1230) and one or more future wind field maps (determined in step 1240) to properly adjust its operation according to the change from current wind conditions to future wind conditions.

FIGS. 13-16 are an exemplary illustration of certain aspects of method 1200. FIGS. 13-16 are best viewed together.

Figure 13:
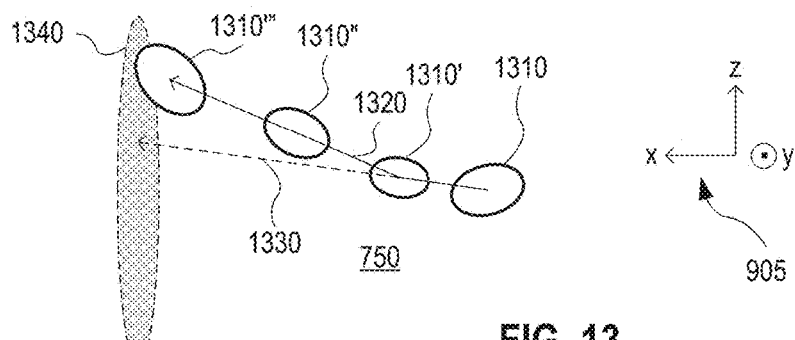
FIG. 13 shows an exemplary local wind event propagating in an atmospheric volume towards a geometric surface.

FIG. 13 shows an exemplary local wind event 1310 propagating in atmospheric volume 750 towards a surface 1340. Wind event 1310 is an example of wind event 755. Surface 1340 is, for example, rotor plane 940 or geometric surface 1040. Wind event 1310 propagates along a path 1320. In this example, the complex nature of the flow field associated with atmospheric volume 750 causes path 1320 to not be straight, and also causes the packet speed of wind event 1310 to change over time. In addition, properties of wind event 1310 change during propagation along path 1320. An initial state of wind event 1310, at a time t1, is shown as an outline labeled 1310. At later times t2, t3, and t4, wind event 1310 is shown as outlines 1310', 1310", and 1310''', respectively. At time t4 wind event 1310 reaches surface 1340. Times t1, t2, t3, and t4 are equidistant. It is evident that, in this example, mathematical propagation of wind event 1310 according to a frozen turbulence assumption would lead to an erroneous prediction of both arrival time and position of wind event 1310 at surface 1340. For example, if the velocity of wind event 1310 was measured at time t1 and, based upon this measurement, mathematically propagated to surface 1340 according to a frozen turbulence assumption, the predicted arrival position would be as shown by arrow 1330. In addition, since the packet speed of wind event 1310 increases over time, a frozen turbulence assumption based propagation would predict a later arrival time than the actual arrival time.

Figure 14A:
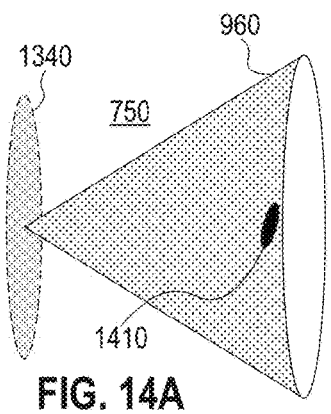
FIGS. 14A-14C show exemplary wind velocity measurements across a conic surface.
Figure 14B:
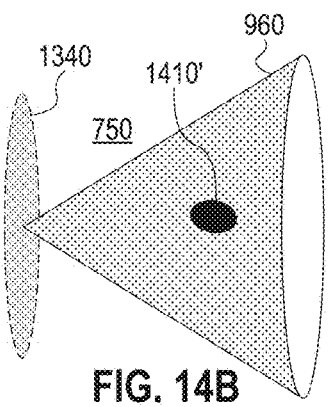
Figure 14C:
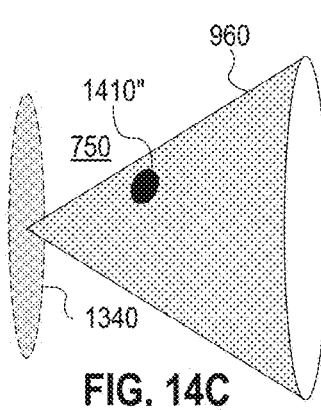

FIGS. 14A-C show exemplary wind velocity measurements across conic surface 960, with apex at surface 1340, at times t1, t2, and t3, respectively. At each of times t1, t2, and t3, at least a portion of wind event 1310 intersects with conic surface 960, while at some time after time t3, wind event 1310 loses contact with conic surface 960. The wind velocity measurement, schematically illustrated in FIGS. 14A-C may be represented by one or more of properties (1) through (12) discussed in reference to FIG. 8, and wind event shows in the wind velocity surface measurements for times t1, t2, and t3 as areas 1410, 1410', and 1410". FIGS. 14A-C are examples of wind velocity measurements obtained in step 1201. In one example, conic surface 960 has length 990 (see FIG. 9A), in the x-direction, in the range between 100 meters and 400 meters, and the distance between individual wind velocity measurement on conic surface 960 is 10 meters or less.

In step 1212, method 1200 propagates each of the wind velocity surface measurements for times t1, t2, and t3, respectively, through time and space in a manner that optimizes the mutual consistency between these wind velocity surface measurements, as discussed in reference to FIG. 12. For the propagation of the wind velocity surface measurements at t1, t2, and t3 (and optionally more times), step 1212 determines wind velocity information for the full volumetric wind field associated with atmospheric volume 750. Specifically, step 1212 produces a time evolution of the full volumetric wind field.

It is understood that the propagation of the wind velocity surface measurements is not only determined by the portions of the wind velocity surface measurements associated with wind event 1310. Other portions may contribute information to the propagation of the wind velocity surface measurements. In one example, each of the wind velocity surface measurements show a vertical shear, such that the wind velocity measured for higher z-values is greater than that measured for lower z-values. This is a common situation for wind-turbines, for example. This vertical shear also must be propagated with optimal consistency between the wind velocity surface measurements and therefore adds information that helps determine the propagation of local wind event 1310.

Figure 15A:
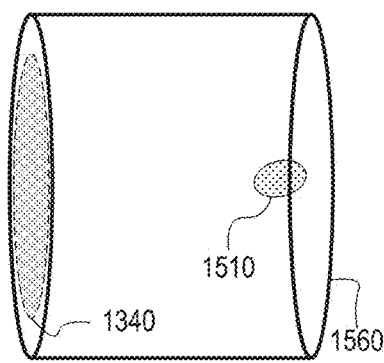
FIGS. 15A-15C show an exemplary time evolution of a full volumetric wind field obtained from the wind velocity surface measurements shown in FIGS. 14A-14C.
Figure 15B:
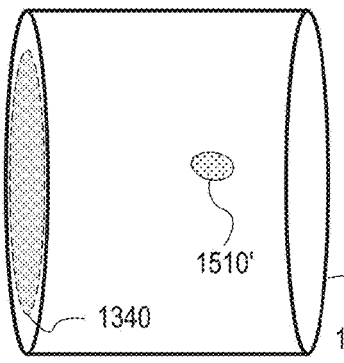
Figure 15C:
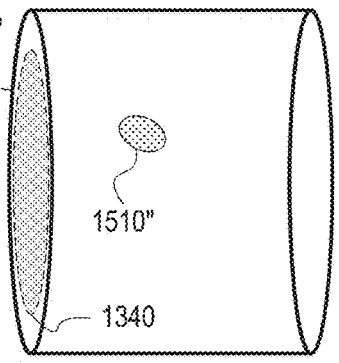

FIGS. 15A-C show an exemplary time evolution of the full volumetric wind field as obtained in step 1212 from the wind velocity surface measurements shown in FIGS. 14A-C. FIGS. 15A-C show volumetric wind field maps 1560, 1560', and 1560" for atmospheric volume 750 at times t1, t2, and t3, respectively. The volumetric wind field maps 1560, 1560', and 1560" estimate the time evolution of wind event 1310 as estimated wind event 1510, 1510', and 1510", respectively.

Figure 16:
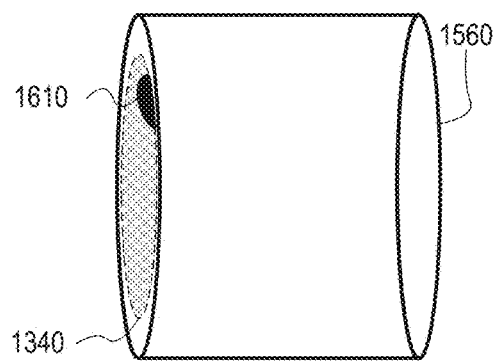
FIG. 16 shows the estimated arrival location of a wind event based upon the time evolution of the full volumetric wind field shown in FIGS. 15A-15C.

FIG. 16 shows the estimated arrival location 1610 of wind event 755 at surface 1340 at time t4, as estimated in step 1220 based upon the time evolution of the full volumetric wind field shown in FIGS. 15A-C.

Figure 17A:
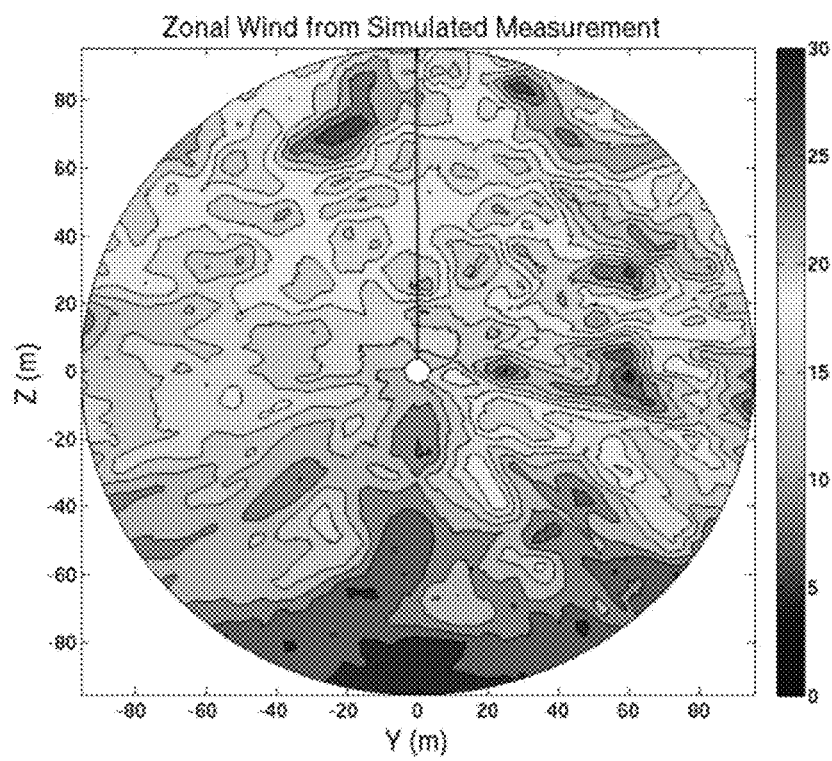
FIGS. 17A-17B shows an exemplary future wind field map, as determined according to an embodiment of the method of FIG. 12, and a corresponding simulated future wind field map.
Figure 17B:
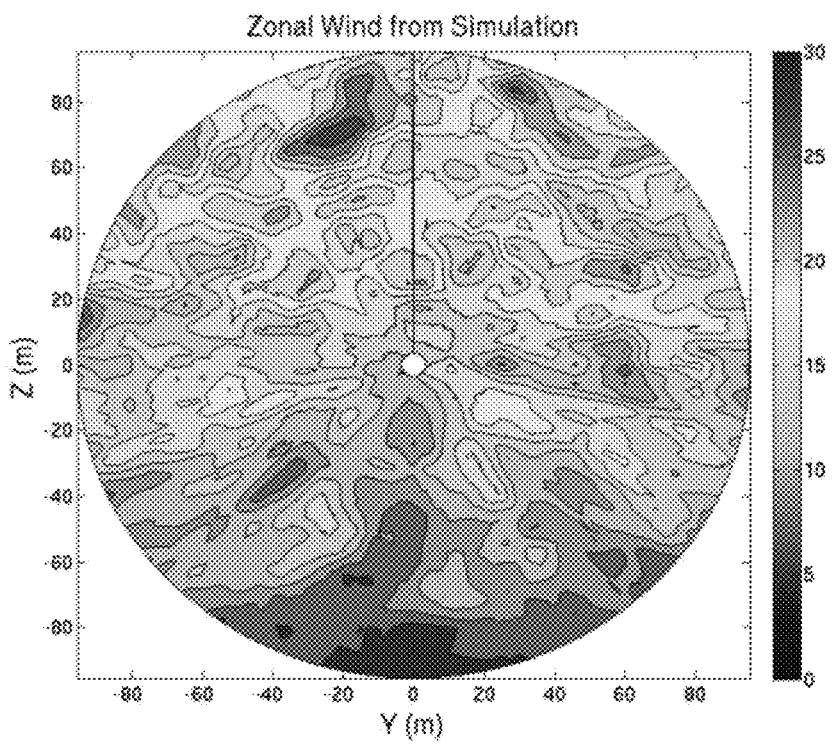

FIG. 17A shows an exemplary future wind field map 1700 showing estimated zonal wind for a surface at aeromechanical structure 730, as determined in step 1240. Future wind field map 1700 is obtained by performing method 1200 on a modeled wind field, using simulated lidar-based wind velocity measurements across conic surface 960, wherein the lidar-based wind velocity measurements are line-of-sight velocity measurements. For comparison, FIG. 17B also shows a corresponding simulated future wind field map 1710, which may be considered the true wind field map. The agreement between future wind field map 1700 and simulated future wind field map 1710 is excellent, thus demonstrating the feasibility of method 1200.

Figure 18:
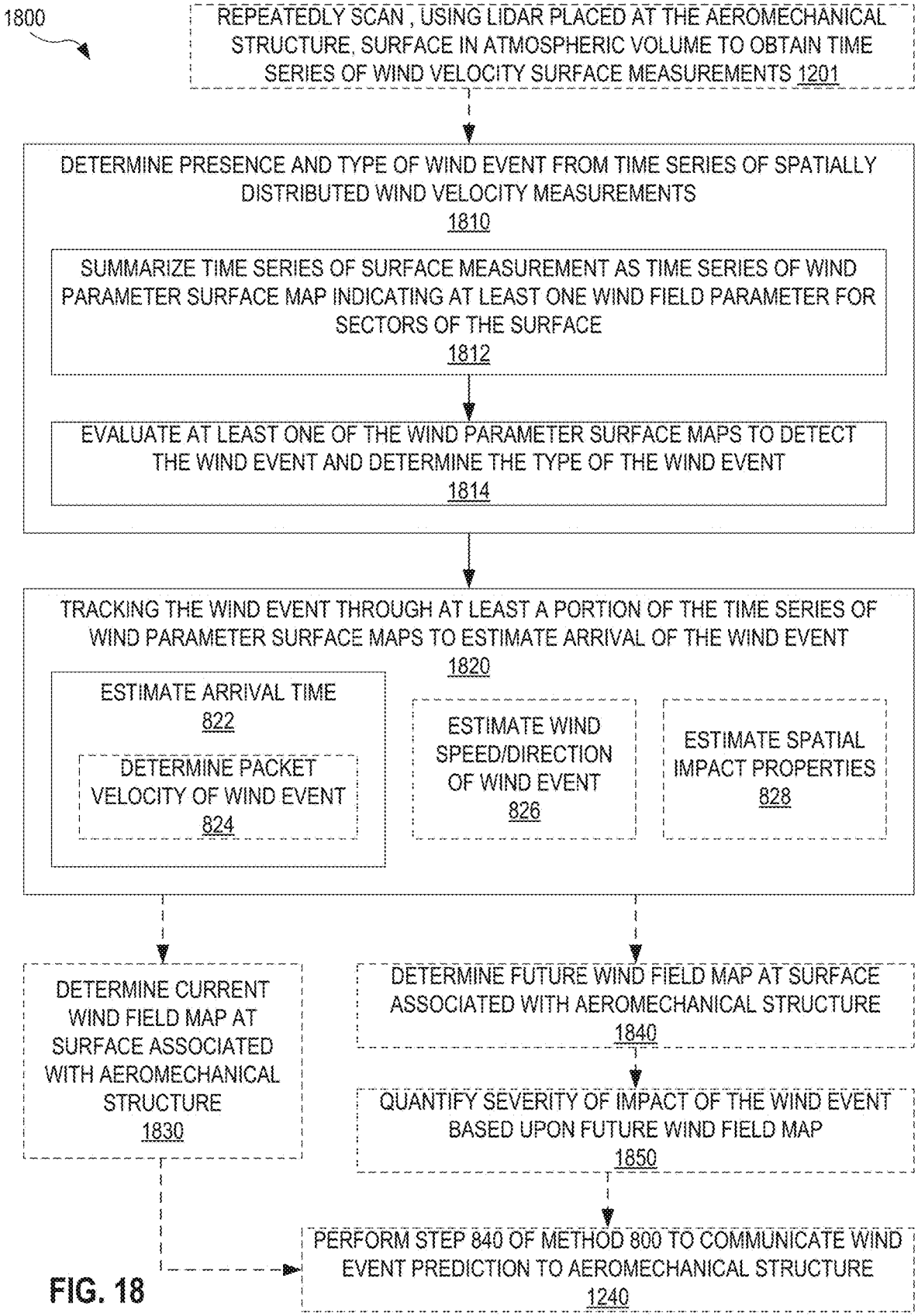
FIG. 18 illustrates a method for predicting arrival of a wind event at an aeromechanical structure, which utilizes wind parameter surface maps, according to an embodiment.

FIG. 18 illustrates one exemplary method 1800 for predicting arrival of wind event 755 at aeromechanical structure 730. Method 1800 summarizes wind velocity surface measurements in wind parameter surface maps to predict arrival of wind event 755 based upon the wind parameter surface maps. Method 1800 is an embodiment of method 800.

In one embodiment, method 1800 includes step 1201.

In a step 1810, method 1800 determines the presence and type of wind event 755 from time series 780 of wind velocity surface measurements. Step 1810 is performed by wind event identification module 712, for example.

Step 1810 includes steps 1812 and 1814. In step 1812, method 1800 summarizes the time series of wind velocity surface measurements as a corresponding time series of wind parameter surface maps, each indicating at least one wind field parameter for a plurality of sectors of the measurement surface. Step 1812 functions to reduce the amount of data. Each sector is sized to include a plurality of individual wind velocity measurements. For each sector, the at least one wind parameter summarizes multiple wind velocity measurements. In one example, each sector summarizes between 3 and 1000 individual wind velocity measurements. Exemplary wind parameters include properties (1) through (12) discussed in reference to FIG. 8. In one example, the wind parameter is an average wind velocity for each sector. Step 1812 may function to reduce the amount of data used in subsequent portions of method 1800. In addition, step 1812 may function to reformulate the wind velocity measurements in terms of one or more wind parameters that highlight wind events of interest.

In step 1814, method 1800 evaluates at least one of the wind parameter surface maps to detect wind event 755 and determine the type of wind event 755. Step 1214 may utilize one or more of properties (1) through (12) to determine the type of wind event 755. In one example, a vertical shear is identified from an upper portion of the volumetric wind field having higher zonal wind speed than a lower portion of the volumetric wind field.

In a step 1820, method 1800 tracks wind event 755 through at least a portion of the time series of wind parameter surface maps, determined in step 1810, to estimate arrival of wind event 755 at aeromechanical structure 730. In one embodiment, method 1800 performs step 1820 when wind event 755 is determined in step 1810. Step 1820 is performed by tracking module 714, for example. Similar to the discussion of step 1212 and FIGS. 13-16, step 1820 may propagate each of the wind parameter surface maps in a mutually consistent manner to estimate the arrival of wind event 755. For example, each wind parameter surface map is propagated in space and time to optimally agree with the temporally subsequent wind parameter surface map. Step 1820 is an embodiment of step 820 of method 800.

Step 1820 includes step 822, and optionally includes one or more of step 824, 826, and 828. When implemented in step 1820, steps 822, 824, 826, and 828 are performed based upon tracking of wind event 755 through at least a portion of the time series of wind parameter surface maps. Properties of wind event 755 estimated in step 1820 may include one or more of properties (1) through (12) discussed in reference to FIG. 8.

In an embodiment, method 1800 includes a step 1840 of determining, based upon the time series of wind parameter surface maps, at least one future wind field map for a surface associated with aeromechanical structure 730, such as rotor plane 940, a geometric surface that is coplanar with rotor plane 940, geometric surface 1040, or surface 1340. Each of the at least one future wind field map indicates the estimated wind field, for example the three-dimensional velocity or the zonal wind velocity, at the surface associated with aeromechanical structure 730 at a future time point. Similarly to the discussion of step 1220 and FIGS. 13-16, step 1840 may propagate each of the wind parameter surface maps in a mutually consistent manner to determine the at least one future wind field map. In one example, step 1840 produces a set of future wind field maps for a duration after the current time, such as a future wind field map for every 0.1 seconds after the current time for at duration of at least three or five seconds. In another example, step 1840 produces one or more future wind field maps for a time that is at least three to five seconds out in the future.

Optionally, method 1800 includes a step 1850 of quantifying the severity of impact of wind event 755 on aeromechanical structure 730 based upon at least one of the future wind field maps. Step 1850 is an embodiment of step 830, which is based upon the at least one future wind field map. Step 1850 may implement steps 832 and 834, as discussed in reference to FIG. 8.

In an embodiment, method 1800 includes a step 1830 of determining, based upon the time series of wind parameter surface maps, a current wind field map for the surface associated with aeromechanical structure 730, using the same method as described in reference to step 1840. The current wind field map indicates the estimated wind field, for example the three-dimensional velocity or the zonal wind velocity, at the surface associated with aeromechanical structure 730 at the current time.

Each of steps 1830, 1840, and 1850 may be performed by wind-predicting unit 710.

Optionally, method 1800 includes step 1240.

Figure 19:
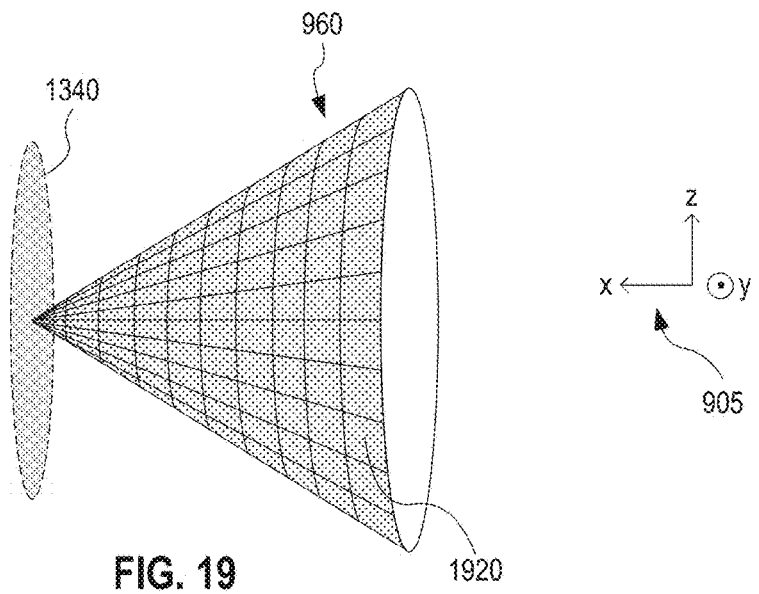
FIG. 19 shows exemplary sectioning of a conic surface into a plurality of sectors, as utilized by an embodiment of the method of FIG. 18.
Figure 20A:
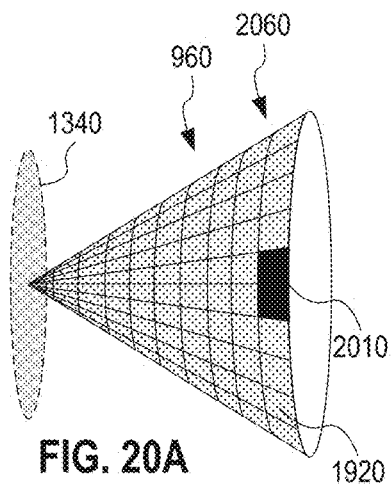
FIGS. 20A-20C schematically depict exemplary wind parameter surface maps.
Figure 20B:
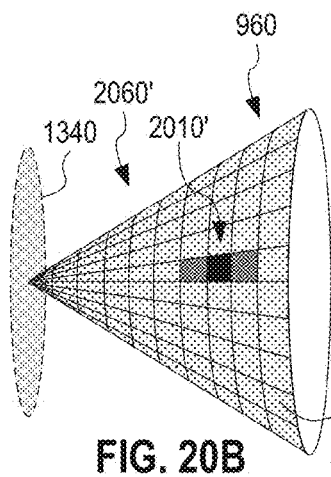
Figure 20C:
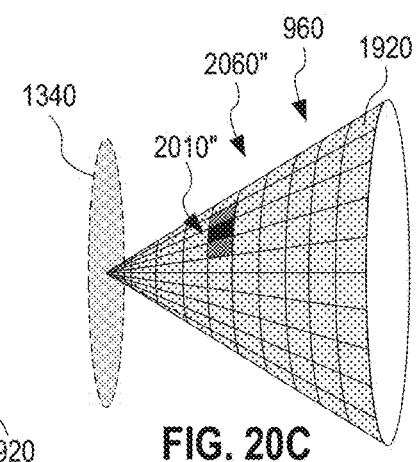
Figure 21:
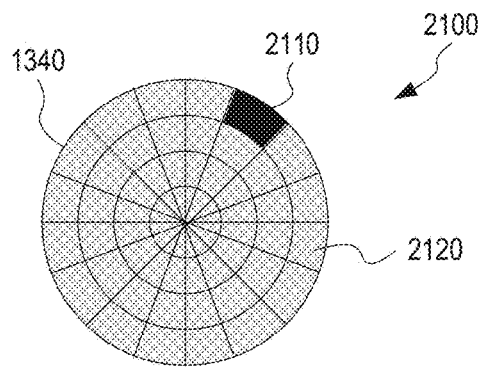
FIG. 21 shows estimated arrival of a wind event based upon the wind parameter surface maps of FIGS. 20A-20C, according to an embodiment.

FIGS. 19-21 are an exemplary illustration of certain aspects of method 1800. FIGS. 19-21 are best viewed together.

FIG. 19 shows exemplary sectioning of conic surface 960 into a plurality of sectors 1920, as utilized by an embodiment of step 1812. FIG. 19 shows conic surface 960 in relation to surface 1340 and in the same view as used for FIG. 13. Conic surface 960 may be sectioned into more sectors 1920 than shown in FIG. 19 to provide greater resolution and/or greater spatial extent, or fewer sectors 1920 than shown in FIG. 19 to reduce resolution and/or spatial extent, without departing from the scope hereof. Likewise, the shape of sectors 1920 may be different from that shown in FIG. 1920. For example, different sectors 1920 may have different shapes and/or sizes. In addition, not all of conic surface 960 needs to be represented by sectors 1920. For example, a portion of conic surface 960 closest to surface 1340 may not be included in sectors 1920. For clarity of illustration, not all sectors 1920 are labeled in FIGS. 19-20C.

FIGS. 20A-20C schematically depict exemplary wind parameter surface maps 1360, 1360', and 1360" of conic surface 960, as summarized in step 1812 using sectors 1920, for times t1, t2, and t3, respectively. Times t1, t2, and t3 are those discussed in reference to FIG. 13. Each sector 1920 of wind parameter surface maps 2060, 2060, and 2060" may indicate one or more of properties (1) through (12) discussed in reference to FIG. 8, as derived from individual wind velocity measurements within the sector 1920 in step 1812. For example, in wind parameter surface map 2060, wind event 1310 shows in sector group 2010; in wind parameter surface map 2060', wind event 1310 shows in sector group 2010'; and in wind parameter surface map 2060", wind event 1310 shows in sector group 2010.

Step 1820 tracks wind event 1310 through wind parameter surface maps 2060, 2060', and 2060", to estimate arrival of wind event 1310 at surface 1340. Step 1820 temporally and spatially propagates wind parameter surface maps 2060, 2060', and 2060" in a manner that produces optimal consistency between wind parameter surface maps 2060, 2060', and 2060".

FIG. 21 shows estimated arrival of wind event at surface 1340 at time t4. Surface 1340 is sectioned into sectors 2120, for example reflecting the projection of sectors 1920 onto surface 1340. Wind event 1310 impacts surface 1340 at a sector 2110. FIG. 21 also represents an exemplary future wind field map 2100, determined in step 1840 based upon wind parameter surface maps 2060, 2060', and 2060".

It is understood that the propagation of the wind velocity surface measurements is not only determined by the portions of the wind velocity surface measurements associated with wind event 1310. Other portions may contribute information to the propagation of the wind velocity surface measurements. In one example, each of the wind velocity surface measurements show a vertical shear, such that the wind velocity measured for higher z-values is greater than that measured for lower z-values. This is a common situation for wind-turbines, for example. This vertical shear also must be propagated with optimal consistency between the wind velocity surface measurements and therefore adds information that helps determine the propagation of local wind event 1310.

Figure 22:
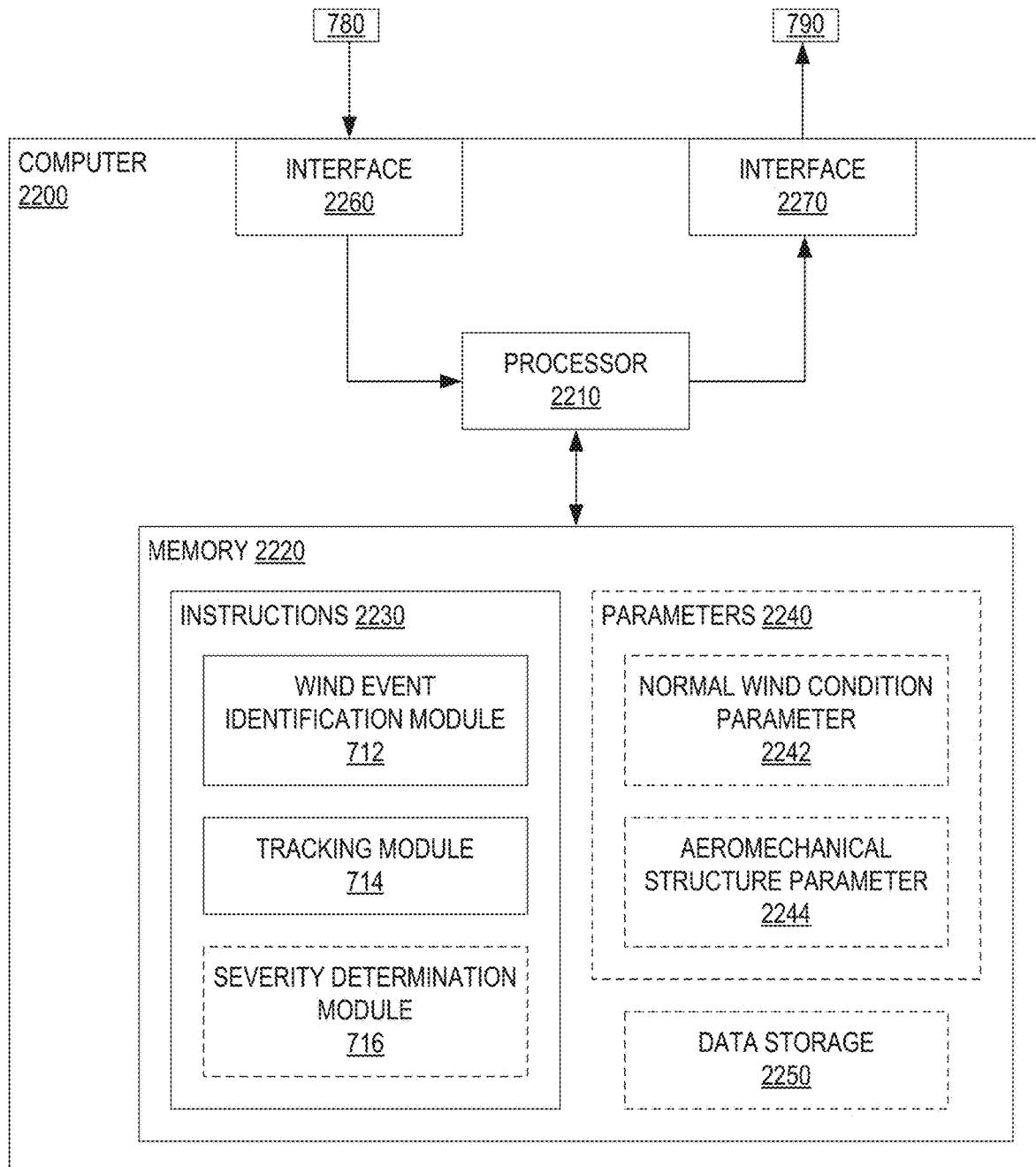
FIG. 22 illustrates a computer that implements a wind-predicting unit of the system of FIG. 7, according to an embodiment.

FIG. 22 illustrates one exemplary computer 2200 that implements wind-predicting unit 710. Computer 2200 includes a processor 2210, a memory 2220, and interfaces 2260 and 2270. Memory 2220 includes machine-readable instructions 2230 encoded in a non-volatile portion of memory 2220. Instructions 2230 implement wind event identification module 712, tracking module 714, and optionally severity determination module 716. In certain embodiments, memory 2220 further includes parameters 2240 used by one or more of wind event identification module 712, tracking module 714, and severity determination module 716. Parameters 2240 may include at least one normal wind condition parameter 2242, as discussed in reference to step 832 of method 800. Additionally, parameters 2240 may include at least one aeromechanical structure parameter 2244, as discussed in reference to step 834 of method 800. In an embodiment, memory 2220 further includes a data storage 2250.

In operation, computer 2200 receives time series 780 via interface 2260. Processor 2210 executes instructions 2230, optionally using parameters 2240 and/or data storage 2250, to generate arrival information 790. Computer 2200 may implement method 800, method 1200, and/or method 1800.

Without departing from the scope hereof, instructions 2230, and optionally parameters 2240, may be provided as a software product configured for implementation on a third party computer system.

Figure 23:
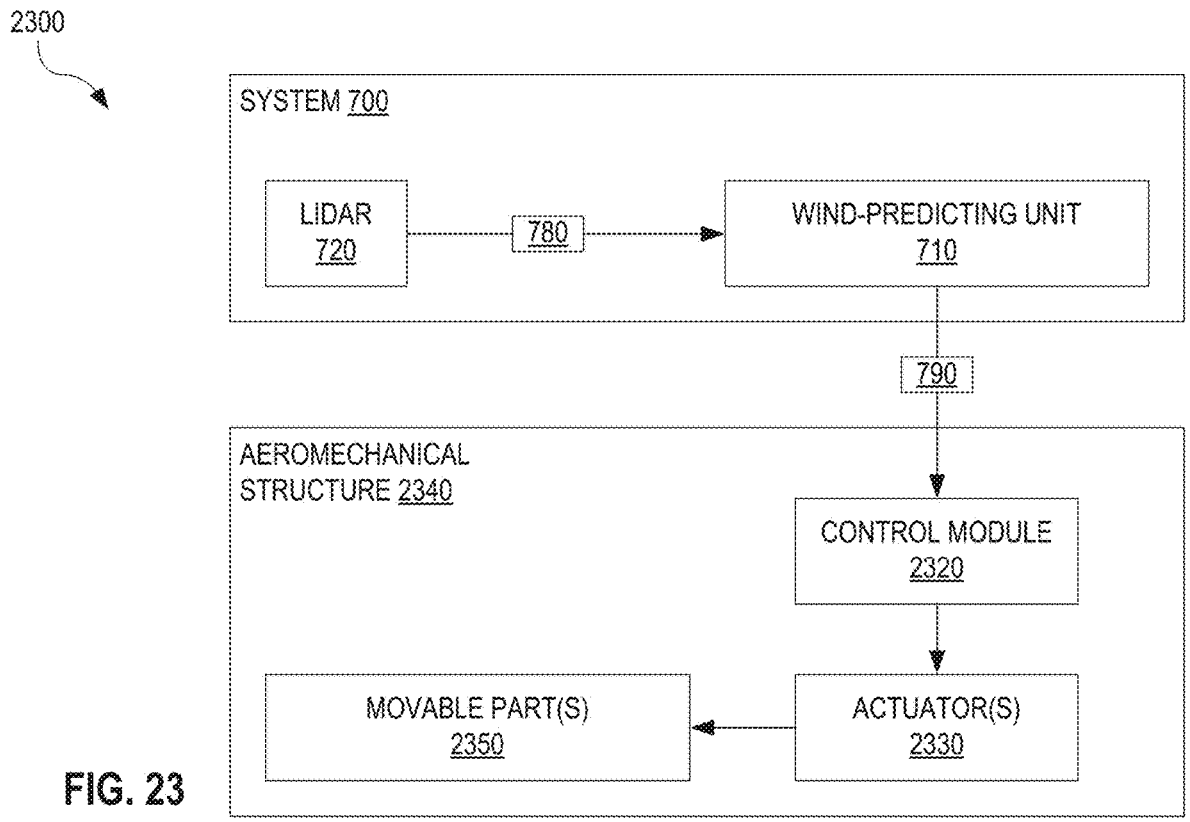
FIG. 23 illustrates an aeromechanical apparatus with prediction-based control of response to a wind event, according to an embodiment.

FIG. 23 illustrates one exemplary aeromechanical apparatus 2300 with prediction-based control of response to wind event 755. Aeromechanical apparatus 2300 integrates system 700 and an aeromechanical structure 2340. Aeromechanical structure 2340 includes a control module 2320, one or more actuators 2330, and one or more movable parts 2350. Aeromechanical structure 2340 is an embodiment of aeromechanical structure 730. Aeromechanical structure 2340 is, for example wind turbine 930 or aircraft 1030. Actuator(s) 2330 regulates coupling between aeromechanical structure 2340 and atmospheric volume 750. In aeromechanical apparatus 2300, system 700 is placed at aeromechanical structure 2340. Lidar 720 may be placed on aeromechanical structure 2340, in aeromechanical structure 2340, or near aeromechanical structure 2340. Examples are shown in FIGS. 9A and 10. Without departing from the scope hereof, wind-predicting unit 710 may be placed away from aeromechanical structure 2340, for example in a remote control center.

Figure 24:
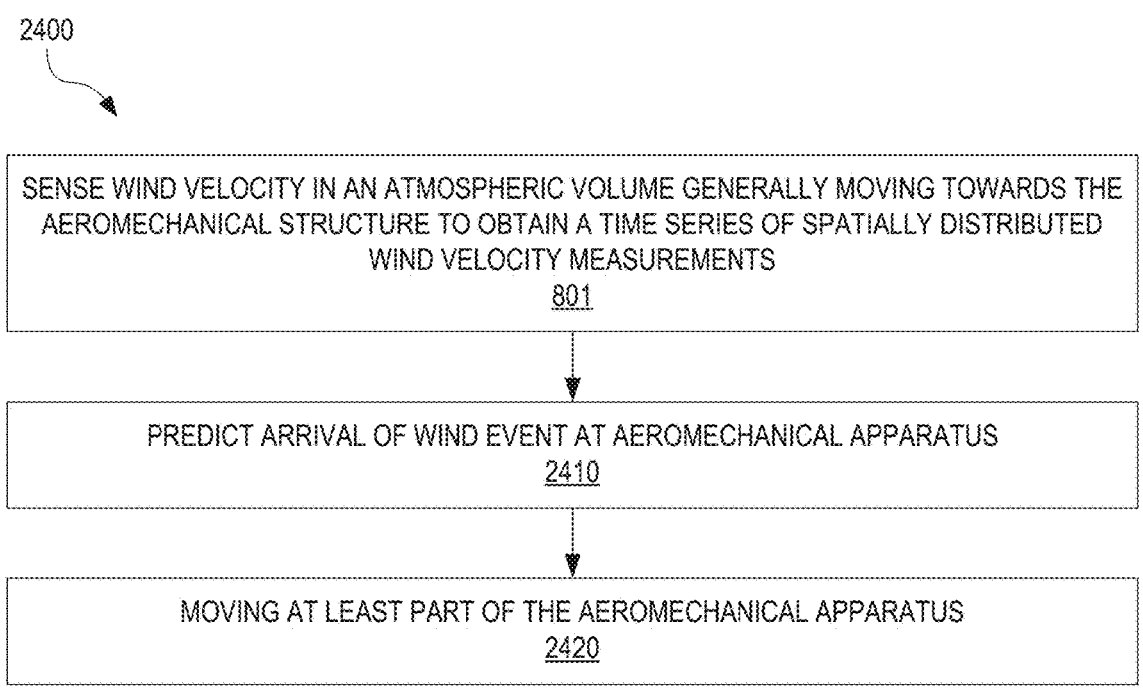
FIG. 24 illustrates a method for adjusting operation of an aeromechanical structure based upon prediction of arrival of a wind event at the aeromechanical structure, according to an embodiment.

FIG. 24 illustrates one exemplary method 2400 for adjusting operation of aeromechanical structure 2340, as implemented in aeromechanical apparatus 2300, based upon prediction of arrival of wind event 755 at aeromechanical structure 2340. Method 2400 includes step 801, wherein lidar 720 senses wind velocity in atmospheric volume 750 to obtain time series 780. In a subsequent step 2410, wind-predicting unit 710 predicts arrival of wind event 755 at aeromechanical structure 2340 based upon time series 780, and determines arrival information 790. Step 2410 may implement one or more of methods 800, 1200, and 1800. Wind-predicting unit 710 communicates arrival information 790 to control module 2320. In a step 2420, control module 2320 adjusts at least one actuator 2330 to move at least one movable part 2350 in anticipation of arrival of wind event 755, so as to optimize operation of aeromechanical structure 2340 in presence of wind event 755 or reduce potential damage to aeromechanical structure 2340 caused by wind event 755.

Figure 25:
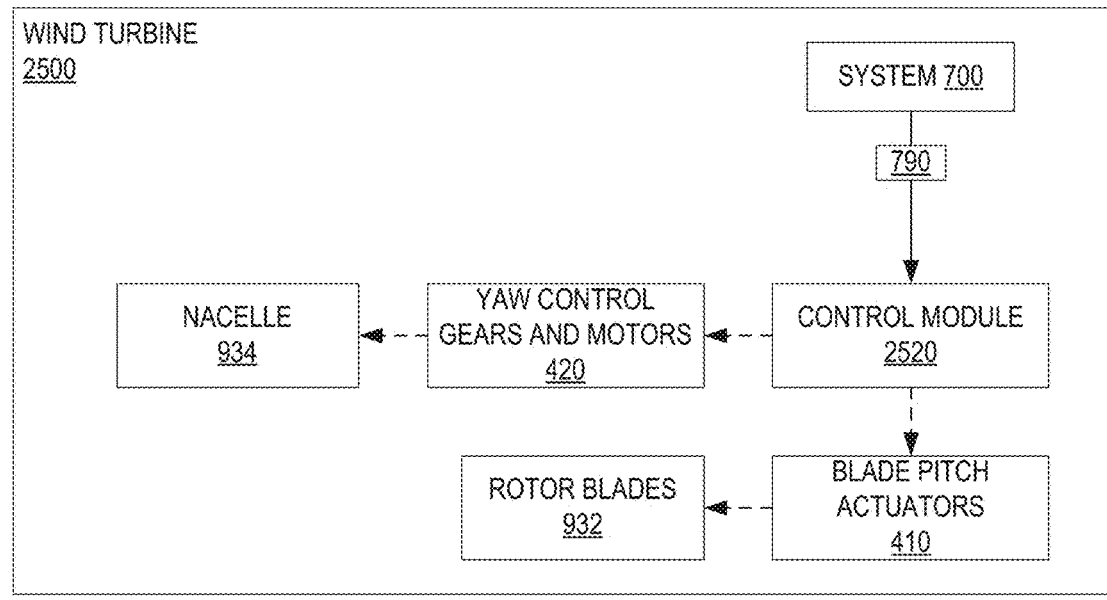
FIG. 25 illustrates a wind turbine with prediction-based control of response to a wind event, according to an embodiment.

FIG. 25 illustrates one exemplary wind turbine 2500 with prediction-based control of response to wind event 755. Wind turbine 2500 is an embodiment of aeromechanical apparatus 2300 and implements method 2400. Wind turbine 2500 includes system 700, a control module 2520, rotor blades 932, blade pitch actuators 410, nacelle 934, and yaw control gears and motors 420. Control module 2520 is an embodiment of control module 2320. Blade pitch actuators 410 and/or yaw control gears and motors 420 form an embodiment of actuators 2330. Nacelle 934 and/or rotor blades 932 form an embodiment of movable parts 2350. Wind turbine 2500 is an example of wind turbine 930, which integrates system 700. In one embodiment, control module 2520 is configured to adjust yaw control gears and motors 420 to move nacelle 934 according to arrival information 790. In another embodiment, control module 2520 is configured to adjust at least one of blade pitch actuators 410 to move at least one respective rotor blade 932 according to arrival information 790. In this embodiment, blade pitch actuators 410 may include a separate pitch control mechanism for each of rotor blades 932, such that blade pitch actuators 410 may adjust each rotor blade 932 independently to regulate coupling between wind turbine 2500 and wind event 755 in an optimal manner. In yet another embodiment, control module 2520 is configured to adjust either or both of yaw control gears and motors 420 and at least one of blade pitch actuators 410 to move nacelle 934 and/or at least one respective rotor blade 932, respectively.

Figure 26:
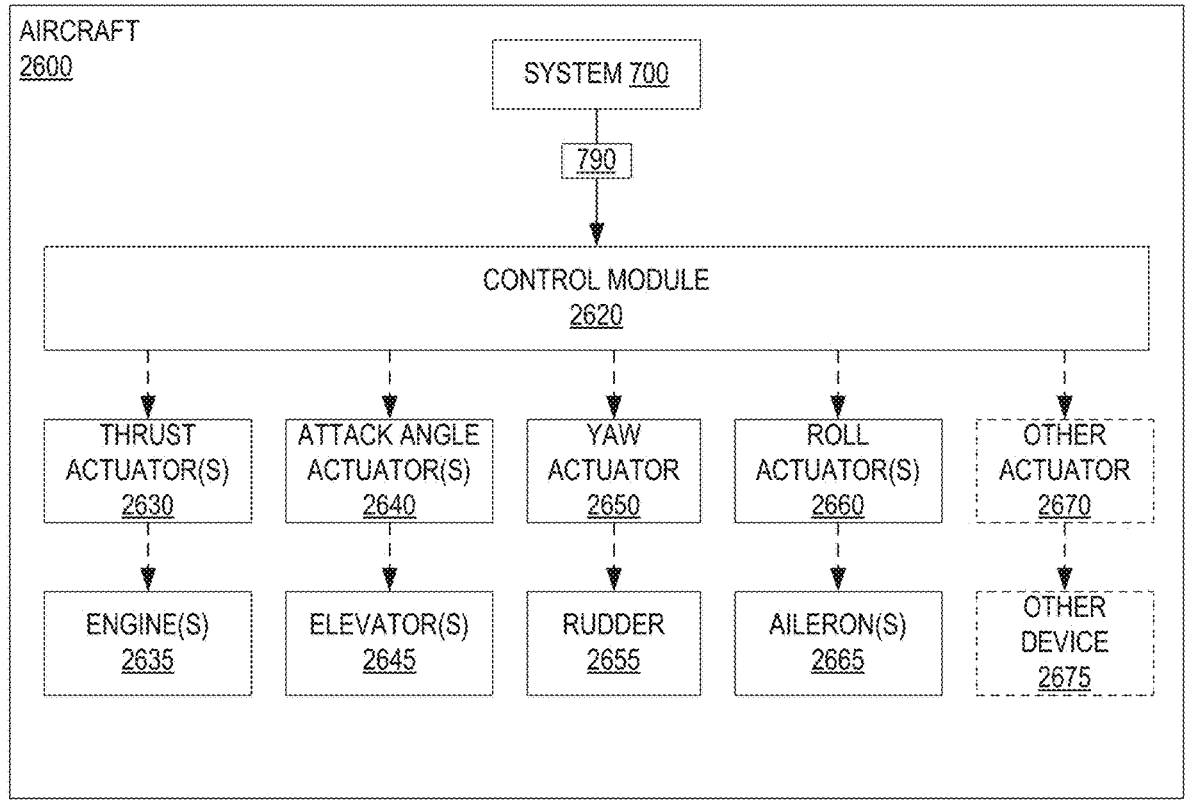
FIG. 26 illustrates an aircraft with prediction-based control of response to a wind event, according to an embodiment.

FIG. 26 illustrates one exemplary aircraft 2600 with prediction-based control of response to wind event 755. Aircraft 2600 is an embodiment of aircraft 1040 and implements method 2400. Aircraft 2600 includes (a) system 700, (b) control module 2620, (c) one or more engines 2635 and one or more respective thrust actuators 2630 that actuate or adjust respective engines 2635 to change travel speed of aircraft 2600, (d) one or more elevators 2645 and one or more respective angle of attack actuators 2640 that move respective elevators 2645 to adjust the angle of attack of aircraft 2600, (e) at least one rudder 2655 and at least one respective yaw actuator 2650 that move a respective rudder 2655 to adjust yaw of aircraft 2600, and (f) one or more ailerons 2665 and one or more respective roll actuators 2660 for moving respective ailerons 2665 to roll aircraft 2600 or adjust roll of aircraft 2600. Optionally, aircraft 2600 further includes one or more other devices 2675 and one or more respective other actuators 2670 that move other devices 2675, respectively, to change flight properties of aircraft 2600. Other devices 2675 may include one or more flaps and/or spoilers, for example. Engine(s) 2635 may include one or more turbines, propellers, piston engines, and/or rocket engines.

Control module 2620 is an embodiment of control module 2320. Thrust actuator(s) 2630, angle of attack actuator(s) 2640, yaw actuator(s) 2650, roll actuator(s) 2660, and optionally other actuator(s) 2670, form an embodiment of actuators 2330. Engine(s) 2635, elevator(s) 2645, rudder 2655, aileron(s) 2665, and optionally other device(s) 2675 form an embodiment of movable parts 2350. Aircraft 2600 is an example of aircraft 1030, which integrates system 700.

In one embodiment, control module 2620 is configured to control at least one of angle of attack actuator(s) 2640, yaw actuator(s) 2650, roll actuator(s) 2660, and other actuator(s) 2670 to move at least one of elevator(s) 2645, rudder 2655, aileron(s) 2665, and other device(s) 2675, respectively, relative to atmospheric volume 750 according to arrival information 790. In this embodiment, each individual control surface included in elevator(s) 2645, rudder 2655, aileron(s) 2665, and other devices 2675 may be independently moved by attack actuator(s) 2640, yaw actuator(s) 2650, roll actuator(s) 2660, and other actuator(s) 2670, respectively, to optimally regulate coupling between aircraft 2600 and wind event 755.

In another embodiment, control module 2520 is configured to control at least one thrust actuator 2630 to adjust at least one respective aircraft engine 2635 according to arrival information 790. In this embodiment, thrust actuator(s) 2630 may include a separate control mechanism for each engine 2635, such that thrust actuators 2630 may adjust each engine 2635 independently to regulate coupling between aircraft 2600 and wind event 755 in an optimal manner. Slowing or accelerating engine(s) 2635 may allow aircraft 2600 to handle turbulence and wind shear more effectively, for example to improve ride comfort. In embodiments of aircraft 2600 that include at least one propeller, thrust actuator(s) 2630 may move the pitch of individual blades of the propeller.

In yet another embodiment, control module 2520 is configured to control either or both of (a) at least one of angle of attack actuator(s) 2640, yaw actuator(s) 2650, roll actuator(s) 2660, and other actuator(s) 2670, and (b) at least one thrust actuator 2630, as discussed above, according to arrival information 790.

Figure 27:
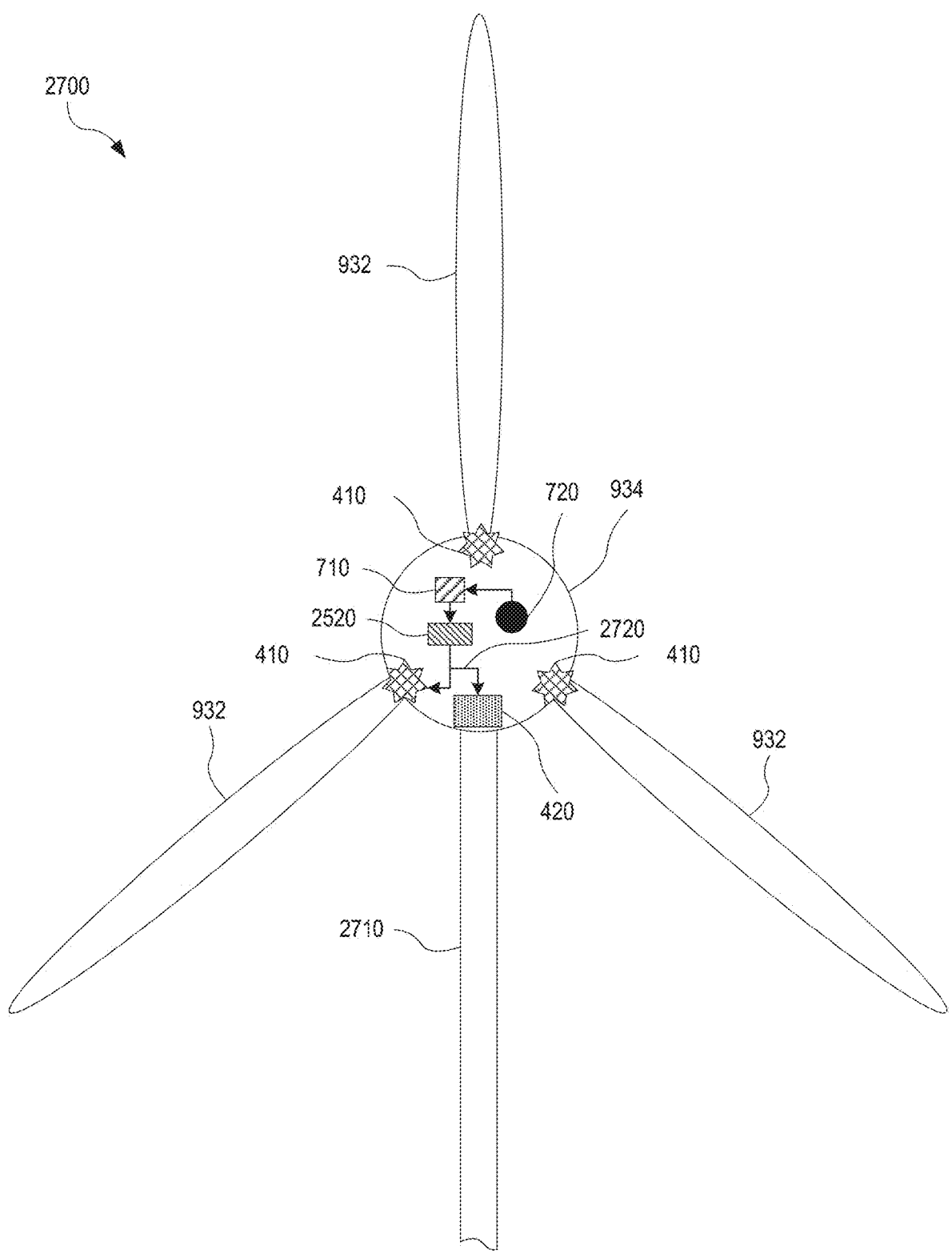
FIG. 27 illustrates another wind turbine with prediction-based control of response to a wind event, according to an embodiment.

FIG. 27 illustrates one exemplary wind turbine 2700 with prediction-based control of response to wind event 755. Wind turbine 2700 is an embodiment of wind turbine 2700 and implements method 2400. Wind turbine 2700 includes nacelle 934, three blades 932, and a tower 2710. Wind turbine 2700 further includes lidar 720, wind-predicting unit 710, and control module 2520. Lidar 720 is mounted on nacelle 720. Additionally, wind turbine 2700 includes three blade pitch actuators 410 that may move blades 932, respectively, to adjust the pitch of blades 932 as dictated by control module 2520 based upon prediction wind event 755 by wind-predicting unit 710. Wind turbine 2700 also includes yaw control gears and motors 420 that may rotate nacelle 934 about the vertical axis of tower 2710 as dictated by control module 2520 based upon prediction wind event 755 by wind-predicting unit 710. When deemed necessary based upon arrival information 790, control module 2520 communicates a control signal via a control line 2720 to one or more of blade pitch actuators 410 and yaw control gears and motors 420, to effect adjustment of blade(s) 932 and/or nacelle 934. For clarity of illustration, not all control lines 2720 are shown in FIG. 27.

Without departing from the scope hereof, wind turbine 2700 may include fewer or more blades 932 than shown in FIG. 27.

Figure 28:
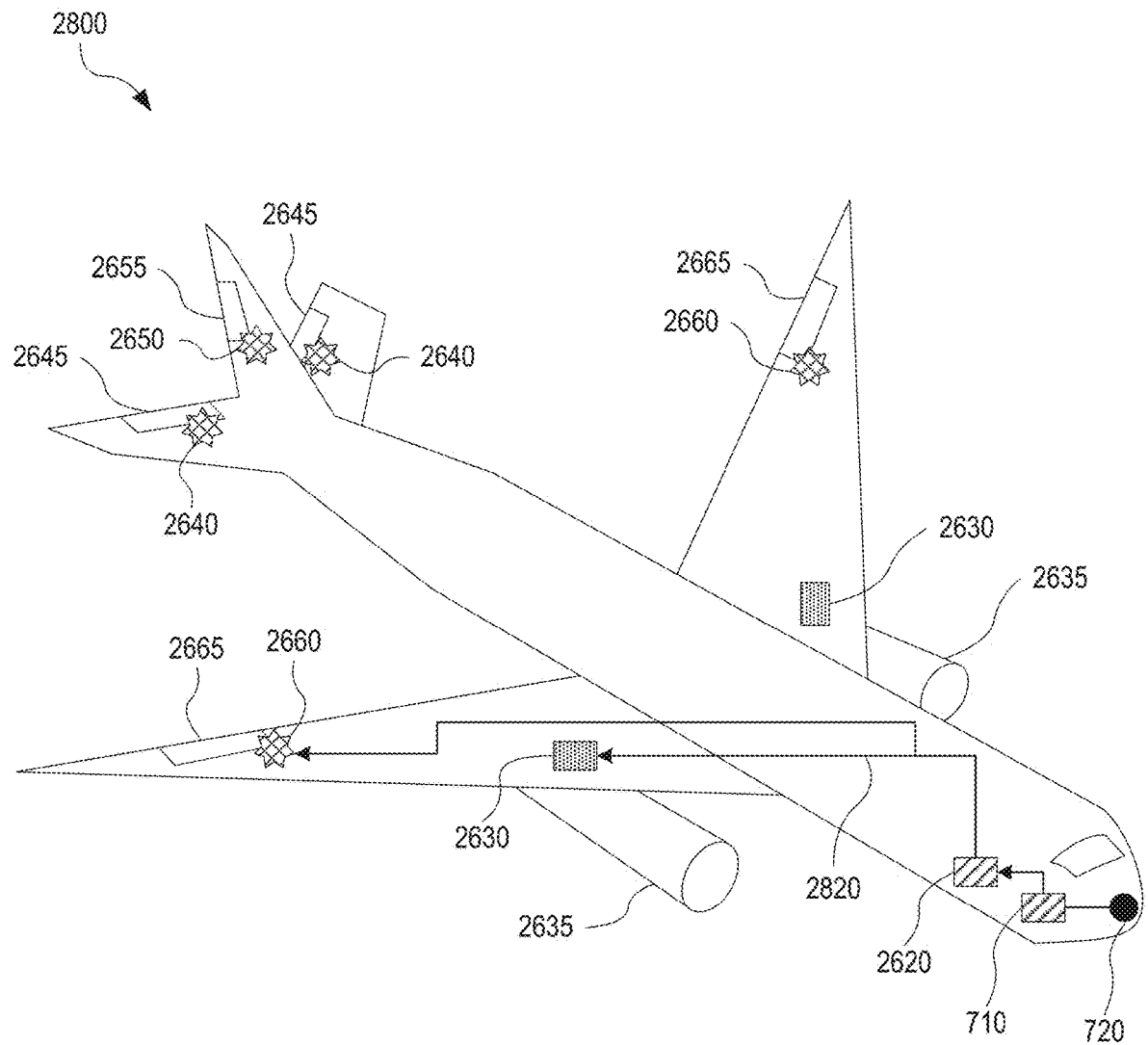
FIG. 28 illustrates another aircraft with prediction-based control of response to a wind event, according to an embodiment.

FIG. 28 illustrates one exemplary aircraft 2800 with prediction-based control of response to wind event 755. Aircraft 2800 is an embodiment of aircraft 2600 and implements method 2400. Aircraft 2800 includes lidar 720, wind-predicting unit 710, and control module 2520. Lidar 720 is mounted near the nose of aircraft 2800 to generally face in the direction of travel of aircraft 2800. Aircraft 2800 includes two engines 2635 and two respectively associated thrust actuators 2630 that may adjust engines 2635 as dictated by control module 2620 based upon prediction wind event 755 by wind-predicting unit 710. Aircraft 2800 further includes (a) two elevators 2645 and two respectively associated angle of attack actuators 2640 that may adjust elevators 2645 as dictated by control module 2620 based upon prediction wind event 755 by wind-predicting unit 710, (b) a rudder 2655 and a yaw actuator 2650 that may adjust rudder 2655 as dictated by control module 2620 based upon prediction wind event 755 by wind-predicting unit 710, and (c) two ailerons 2665 and two respectively associated roll actuators 2660 that may adjust ailerons 2665 as dictated by control module 2620 based upon prediction wind event 755 by wind-predicting unit 710. When deemed necessary based upon arrival information 790, control module 2620 communicates a control signal via a control line 2820 to one or more of thrust actuator(s) 2630, angle of attack actuator(s) 2640, yaw actuator(s) 2650, and roll actuator(s) 2660, to effect adjustment of engine(s) 2635, elevator(s) 2645, rudder 2655, and/or aileron(s) 2665. For clarity of illustration, not all control lines 2820 are shown in FIG. 28.

Without departing from the scope hereof, aircraft 2800 may include one or more other devices 2675 and one or more other actuators 2670. Also without departing from the scope hereof, aircraft 2800 may be equipped with fewer or more of each of thrust actuators 2630, engines 2635, angle of attack actuators 2640, elevators 2645, rudder 2655, yaw actuators 2650, roll actuators 2660, and ailerons 2665; and the placement of these components may differ from that shown in FIG. 28.

Having described several embodiments, it will be recognized by those skilled in the art that various modifications, alternative constructions and equivalents may be used without departing from the spirit of the disclosure, for example, variations in sequence of steps and configuration, etc. Additionally, a number of well known mathematical derivations and expressions, processes and elements have not been described in order to avoid unnecessarily obscuring the present disclosure. Accordingly, the above description should not be taken as limiting the scope of the disclosure.

It should thus be noted that the matter contained in the above description or shown in the accompanying drawings should be interpreted as illustrative and not in a limiting sense. The following claims are intended to cover generic and specific features described herein, as well as all statements of the scope of the present methods, systems, and apparatus.

What is claimed is:

1. A method for predicting arrival of a wind event at an aeromechanical structure, comprising:

repeatedly scanning, with lidar, a three-dimensional geometric surface in an atmospheric volume moving towards the aeromechanical structure to measure a time series of spatially distributed wind velocity measurements on the three-dimensional geometric surface, the three-dimensional geometric surface having fixed location relative to the aeromechanical structure, the time series of spatially distributed wind velocity measurements including a time series of surface measurements of wind velocity over a first geometric surface at a predetermined location relative to the aeromechanical structure;

numerically propagating the surface measurements temporally and spatially in a mutually consistent manner to predict, from said numerically propagating, a time evolution of volumetric wind field for the atmospheric volume, the time evolution of the volumetric wind field not limited to the three-dimensional geometric surface scanned by the lidar;

evaluating at least one time point of the time evolution to detect the wind event and determine type of the wind event;

prior to arrival of the wind event at the aeromechanical structure, tracking propagation of the wind event through at least a portion of the time evolution to estimate arrival time of the wind event at the aeromechanical structure; and communicating feed-forward control data enabling adjustment of the aeromechanical structure in anticipation of the wind event, the feed-forward control data including at least the arrival time.

2. The method of claim 1, the step of tracking comprising determining, from the time evolution, packet velocity of the wind event to estimate the arrival time.

3. The method of claim 1, further comprising:
extracting, from the time evolution, (a) a wind field map of current values of the volumetric wind field at a second geometric surface associated with the aeromechanical structure, and (b) at least one wind field map of future values of the volumetric wind field associated with the wind event at the second geometric surface of the aeromechanical structure, to provide the feed-forward control data.

4. The method of claim 1, further comprising:
in the step of determining, (a) summarizing the time series of surface measurements as a corresponding time series of wind parameter surface maps, each of the wind parameter surface maps indicating at least one wind-field parameter for a plurality of sectors, each of the sectors being associated with several individual wind velocity measurements, and (b) evaluating at least one of the wind parameter surface maps to detect the wind event and determine type of the wind event.

5. The method of claim 4, further comprising:
determining, from the time evolution, (a) a wind parameter map of current values of the at least one wind-field parameter at a second geometric surface located at the aeromechanical structure, and (b) at least one wind field map of future values of the at least one wind-field parameter associated with the wind event at the second geometric surface, to provide the feed-forward control data.

6. The method of claim 1, the aeromechanical structure being a wind turbine, the step of tracking further comprising estimating impact location of the wind event on rotor plane of the wind turbine with spatial resolution no courser than one third of diameter of the rotor plane.

7. The method of claim 6, the step of tracking comprising estimating the arrival time at least three seconds before arrival of the wind event at the rotor plane.

8. The method of claim 1, the aeromechanical structure being an aircraft, the atmospheric volume moving towards the aircraft as viewed from reference frame of the aircraft.

9. The method of claim 1, further comprising:
in the step of evaluating, determining type of the wind event from at least one time point of the time evolution;
in the step of tracking, tracking wind speed of the wind event to determine an estimated wind speed of the wind event upon arrival at the aeromechanical structure;
calculating deviation of the estimated wind speed from a predefined normal wind speed; and
quantifying, based upon the deviation and effect of impact of the type of the wind event on the aeromechanical structure, severity of impact of the wind event on the aeromechanical structure.

10. The method of claim 9, further comprising:
in the step of communicating, communicating, to the aeromechanical structure, the arrival time, the type, and a severity metric indicating the severity; and
adjusting operation of the aeromechanical structure according to the arrival time, the type, and the severity metric.

11. The method of claim 1, the step of sensing comprising:
repeatedly scanning the three-dimensional geometric surface, with the lidar being placed at the aeromechanical structure, to obtain the time series of spatially distributed wind velocity measurements as measurements of wind velocity along line-of-sight of lidar beam.

12. The method of claim 11, the step of repeatedly scanning comprising repeatedly scanning a conic surface, having apex at the lidar, to obtain the time series of spatially distributed wind velocity measurements.

13. The method of claim 12, the aeromechanical structure being a wind turbine, and the wind event being a horizontal wind event impacting the wind turbine predominantly along a horizontal direction parallel to rotor plane of the wind turbine.

14. The method of claim 11, the step of repeatedly scanning comprising repeatedly scanning both a predominantly vertically oriented surface and a predominantly horizontally oriented surface to obtain the time series of spatially distributed wind velocity measurements.

15. The method of claim 14, the aeromechanical structure being an aircraft, and the wind event having velocity component predominantly orthogonal to direction of travel of the aircraft.

16. A system for predicting arrival of a wind event at an aeromechanical structure, comprising:
a lidar for repeatedly scanning a three-dimensional geometric surface in an atmospheric volume moving towards the aeromechanical structure to measure a time series of spatially distributed wind velocity measurements on the three-dimensional geometric surface, the three-dimensional geometric surface having fixed location relative to the aeromechanical structure, the time series of spatially distributed wind velocity measurements including a time series of surface measurements of wind velocity over a first geometric surface at a predetermined location relative to the aeromechanical structure;
a wind event identification module for (a) numerically propagating the surface measurements temporally and spatially in a mutually consistent manner to predict, from said numerically propagating, a time evolution of volumetric wind field for the atmospheric volume, the time evolution being predicted for a volumetric wind field not limited to the three-dimensional geometric surface scanned by the lidar, and (b) evaluating at least one time point of the time evolution to detect the wind event and determine type of the wind event; and a tracking module for, prior to arrival of the wind event at the aeromechanical structure, tracking the wind event through at least a portion of the time evolution to estimate arrival time of the wind event at the aeromechanical structure; and an interface for communicating feed-forward control data enabling adjustment of the aeromechanical structure in anticipation of the wind event, the feed-forward control data including at least the arrival time.

17. The system of claim 16, the lidar being configured to repeatedly scan a conic surface in the atmospheric volume to obtain the time series of spatially distributed wind velocity measurements from wind measurements on the conic surface, the conic surface having apex at the lidar.

18. The system of claim 16, the lidar being configured to repeatedly scan a radially expanding rosette surface to obtain the time series of spatially distributed wind velocity measurements from wind measurements on the radially expanding rosette surface, the radially expanding rosette surface having apex at the lidar.

19. The system of claim 16, the wind event identification module being configured to determine type of the wind event from the at least one time point of the time evolution, the tracking module being configured to determine an estimated wind speed of the wind event upon arrival at the aeromechanical structure, the system further comprising a severity determination module for generating, at least based upon the type and the wind speed, a severity metric indicating severity of effect of the wind event on the aeromechanical structure, the feed-forward control data including the arrival time, the type, and the severity metric.

20. The system of claim 19, further including (a) at least one first parameter characterizing at least one respective property of the aeromechanical structure and (b) at least one second parameter characterizing normal wind condition, the severity determination module being configured to utilize the at least one first parameter and the at least one second parameter to generate the severity metric.

21. Aeromechanical apparatus with prediction-based control of response to a wind event, comprising:

an aeromechanical structure;

a lidar, mounted on the aeromechanical structure, for repeatedly scanning a three-dimensional geometric surface in an atmospheric volume moving towards the aeromechanical structure to measure a time series of spatially distributed wind velocity measurements on the three-dimensional geometric surface having fixed location relative to the aeromechanical structure;

a wind event identification module for (a) numerically propagating the surface measurements temporally and spatially in a mutually consistent manner to predict, from said numerically propagating, a time evolution of volumetric wind field for the atmospheric volume, the time evolution being predicted for a volumetric wind field not limited to the three-dimensional geometric surface scanned by the lidar, and (b) evaluating at least one time point of the time evolution to detect the wind event and determine type of the wind event;

a tracking module for, prior to arrival of the wind event at the aeromechanical structure, tracking the wind event through at least a portion of the time evolution to estimate arrival time of the wind event at the aeromechanical structure;

at least one actuator for moving at least part of the aeromechanical structure relative to the atmospheric volume; and a control module for controlling the actuator based upon feed-forward control data including at least the arrival time.

22. The aeromechanical apparatus of claim 21, the control module being configured to control the actuator according to the arrival time and the type.

23. The aeromechanical apparatus of claim 22, the wind event identification module being configured to determine type of the wind event from the at least one time point of the time evolution, the tracking module being configured to determine an estimated wind speed of the wind event upon arrival at the aeromechanical structure, the aeromechanical structure further comprising a severity determination module for generating, at least based upon the type and the wind speed, a severity metric indicating severity of effect of the wind event on the aeromechanical structure, the feed-forward control data including the arrival time, the type, and the severity metric.

24. The aeromechanical apparatus of claim 21, the aeromechanical structure being a wind turbine, the lidar being mounted on nacelle of the wind turbine, and the at least one mechanical element being rotor blades.

25. The aeromechanical apparatus of claim 24, the wind event identification module and the tracking module being cooperatively configured for predicting the arrival time at least three seconds prior to the arrival, to allow at least three seconds for adjustment of the rotor blades.

26. The aeromechanical apparatus of claim 24, the wind event identification module and the tracking module being cooperatively configured to estimate spatial structure of the wind event at the wind turbine with spatial resolution no courser than one third of diameter of rotor plane of the rotor blades.

27. The aeromechanical apparatus of claim 21, the aeromechanical structure being an aircraft, the lidar being mounted on the aircraft facing a direction of travel of the aircraft.

28. The aeromechanical apparatus of claim 27, the wind event identification module and the tracking module being cooperatively configured to estimate spatial structure of the wind event at the aircraft with spatial resolution no courser than half of length of the aircraft.

* * * * *

UNITED STATES PATENT AND TRADEMARK OFFICE
CERTIFICATE OF CORRECTION

PATENT NO. : 10,746,901 B2  
APPLICATION NO. : 14/715869  
DATED : August 18, 2020  
INVENTOR(S) : Martin O'Brien et al.

Page 1 of 1

It is certified that error appears in the above-identified patent and that said Letters Patent is hereby corrected as shown below:

In the Specification

Column 16, Lines 44, "resolution no courser than one third" should read -- resolution no coarser than one third --

Column 16, Line 59, "resolution no courser than half" should read -- resolution no coarser than half --

In the Claims

Column 27, Line 63, "resolution no courser than one third" should read -- resolution no coarser than one third --

Column 30, Lines 44 and 45, "resolution no courser than one third" should read -- resolution no coarser than one third --

Column 30, Lines 54 and 55, "resolution no courser than half of length" should read -- resolution no coarser than half of length --

Signed and Sealed this  
Twenty-ninth Day of December, 2020

Andrei Iancu  
*Director of the United States Patent and Trademark Office*